United States Patent
Duncan et al.

(10) Patent No.: US 10,904,012 B1
(45) Date of Patent: Jan. 26, 2021

(54) EMAIL AUTHENTICATION AND DATA INTEGRITY VALIDATION

(71) Applicant: Fraudmarc Inc., Atlanta, GA (US)

(72) Inventors: Richard Duncan, Atlanta, GA (US); Keith Wayne Coleman, Atlanta, GA (US)

(73) Assignee: Fraudmarc Inc., Atlanta, GA (US)

( * ) Notice: Subject to any disclaimer, the term of this patent is extended or adjusted under 35 U.S.C. 154(b) by 0 days.

(21) Appl. No.: 16/926,717

(22) Filed: Jul. 12, 2020

(51) Int. Cl.
*H04L 29/06* (2006.01)
*H04L 9/32* (2006.01)
*H04L 12/58* (2006.01)

(52) U.S. Cl.
CPC .......... *H04L 9/3247* (2013.01); *H04L 51/046* (2013.01); *H04L 51/18* (2013.01); *H04L 51/22* (2013.01)

(58) Field of Classification Search
CPC .................... H04L 63/0428; H04L 9/3247
See application file for complete search history.

(56) References Cited

U.S. PATENT DOCUMENTS

| | | | |
|---|---|---|---|
| 7,313,700 B2 | 12/2007 | Delany | |
| 8,090,954 B2 | 1/2012 | Paya et al. | |
| 8,312,266 B2 | 11/2012 | Yoshioka et al. | |
| 8,443,193 B1 | 5/2013 | Dreymann et al. | |
| 8,572,696 B1* | 10/2013 | Wiacek | H04L 63/107 726/4 |
| 8,578,166 B2 | 11/2013 | De Monseignat et al. | |
| 10,116,609 B2 | 10/2018 | Zink et al. | |
| 2005/0039019 A1* | 2/2005 | Delany | H04L 9/3263 713/176 |
| 2017/0034100 A1* | 2/2017 | Zink | H04L 51/30 |
| 2018/0375877 A1* | 12/2018 | Jakobsson | G06F 16/955 |
| 2019/0312729 A1 | 10/2019 | Sachtjen et al. | |

FOREIGN PATENT DOCUMENTS

JP 4727627 1/2009

* cited by examiner

*Primary Examiner* — Jason K Gee
(74) *Attorney, Agent, or Firm* — Bekiares Eliezer LLP

(57) ABSTRACT

A method consistent with embodiments of the present disclosure may begin with retrieving a message to be electronically transmitted. The method may proceed with digitally securing the message by generating a first digital signature for the message. The first digital signature may be added to a list of digital signatures for inclusion in the message. A list of allowed anticipated changes may be retrieved. In accordance to embodiments disclosed herein, the message may be pre-signed for the allowed anticipated changes. Pre-signing the message may comprise editing the message with each allowed anticipated change, generating a subsequent digital signature for the message edited with the allowed anticipated change, and adding the subsequent digital signature to the list of digital signatures for inclusion in the electronic message. This process may be repeated for each allowed anticipated change in the allowed anticipated changes.

30 Claims, 12 Drawing Sheets

Platform 100

EMAIL AUTHENTICATION AND DATA INTEGRITY VALIDATION

FIELD OF DISCLOSURE

The present disclosure generally relates to secure and authentic emails. More specifically, the present disclosure provides a novel and inventive way of securely sending emails, while provisioning for a plurality of pre-approved alterations, by, for example, a forwarding party.

BACKGROUND

The early specifications for email messaging never mention security considerations for the protocol. Almost twenty years later, an update to the Simple Mail Transfer Protocol (SMTP) specification included a section dedicated to security considerations. The opening line to the first subsection titled 'Mail Security and Spoofing' opens with the declaration:

> SMTP mail is inherently insecure in that it is feasible for even fairly casual users to negotiate directly with receiving and relaying SMTP servers and create messages that will trick a naive recipient into believing that they came from somewhere else.

This exact wording survives in the corresponding section of the 2008 update. Essentially, email was developed without any means for providing guarantees about the identity of senders; consequently, a significant amount of non-legitimate emails contain information that deliberately misrepresents the origin of the message. The reputation of an organization can be leveraged by impersonating their domain, thereby improving the chances that an illegitimate sender's fraudulent intentions can succeed.

In recent years, multiple authentication protocols have been developed for the purpose of mitigating this openly-known vulnerability in email domain identity. Subsequently, these have been incorporated into much of the mail server infrastructure used for transferring email messages across the internet and across organizational boundaries into inboxes. The application and management of these new protocols has proven overly technical and time-consuming to those who are not experts in email sending infrastructure; as a result, adoption has been slow and the landscape has been permeated with erroneous and ineffective implementations. Those receiving emails from impersonated domains with broken or no authentication support are thus vulnerable to the improper calls to action which include account take-overs, exfiltration of sensitive private data, and the theft of financial assets.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

Methods, systems, and computer-readable media for email authentication and data integrity validation may be provided. A method consistent with embodiments of the present disclosure may begin with retrieving a message to be electronically transmitted. The method may proceed with digitally securing the message by generating a first digital signature for the message. The first digital signature may be added to a list of digital signatures for inclusion in the message.

Either prior or subsequent to the first digital signature, a list of allowed anticipated changes may be retrieved. In accordance to embodiments disclosed herein, the message may be pre-signed for the allowed anticipated changes. Pre-signing the message may comprise editing the message with each allowed anticipated change, generating a subsequent digital signature for the message edited with the allowed anticipated change, and adding the subsequent digital signature to the list of digital signatures for inclusion in the electronic message. This process may be repeated for each allowed anticipated change in the allowed anticipated changes.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1A:
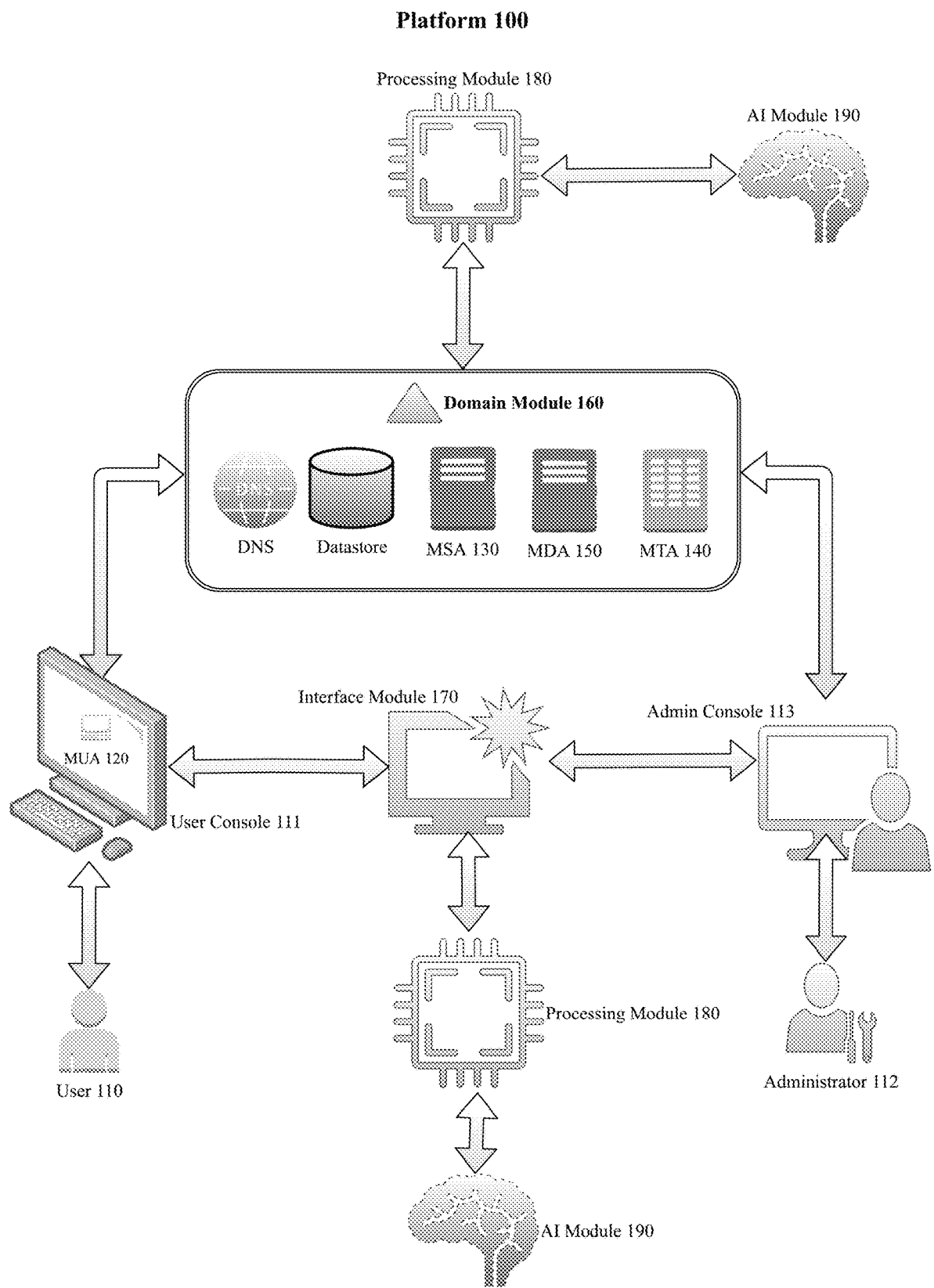
FIGS. 1A, 1B and 1C illustrate block diagrams of a platform 100 and/or operating environments consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list".

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subject matter disclosed under the header.

The present disclosure includes many aspects and features. Moreover, while many aspects and features relate to, and are described in, the context of email authentication and integrity validation, embodiments of the present disclosure are not limited to use only in this context.

I. Platform Overview

This overview is provided to introduce a selection of concepts in a simplified form that are further described below. This overview is not intended to identify key features or essential features of the claimed subject matter. Nor is this overview intended to be used to limit the claimed subject matter's scope.

Email Service Provider's (ESP) sending behaviors and forwarding practices that may not fulfill an organization's need to comply with domain identity security have caused many domain owners to surrender to these obstacles and not work toward implementing functional DMARC reject policies. The ARC protocol was developed to alleviate some of the impediments to deliverability due to DMARC-breaking forwarding, but the rules associated with chains of authentication trust may be too-subjective and may have proven to facilitate malicious mail deliveries.

Substantial damage may be done to an organization's employees, customers, vendors, or others if their brand is thought to be protected against impersonation attacks while an overly-permissive and/or compromised trust chain improperly and/or irresponsibly recasts the state of a message's DMARC authentication from failing to passing.

Instead of intermediary trust chains such as, but not limited to ARC, a deliberate pre-signing of a message as a means to explicitly authorize message delivery across organizational trust boundaries in accordance with a domain administrator's strict set of rules may be preferred. In this way, only the messages that should pass DMARC authentication may be those that have been configured for deliverability by an authorized sender. With tighter controls over which messages are allowed to authenticate against the originating domain, a significant improvement to an organization's identity security may be realized over ARC-influenced upgrades to authorization assertions over which a domain administrator has no control. The present disclosure provides the technical details of this message pre-signing.

A. Glossary

Embodiments of the present disclosure may comprise terms, acronyms, and concepts comprising, but not limited to, at least one of the following:

Graphical User Interface (GUI)—A form of user interface that may allow at least one user to interact with computing devices 800 through graphics and audio, such as, but not limited to, window manager and primary notation. The term GUI may be used interchangeably with the term User Interface (UI) herein.

Base64—A group of binary-to-text encoding schemes that may represent data, such as, but not limited to binary data, in an ASCII string format by translating it into a radix-64 representation. The term Base64 originates from a specific MIME content transfer encoding. Each Base64 digit may represent exactly 6 bits of data. Three 8-bit bytes (i.e., a total of 24 bits) can therefore be represented by four 6-bit Base64 digits. Base64 may be common to all binary-to-text encoding schemes. Base64 is designed to carry data stored in binary formats across channels that only reliably support text content. Base64 is particularly prevalent on the World Wide Web.

Electronic Mail (Mail/eMail)—A method of exchanging messages ("mail") over a network of computing devices 800 between clients and/or users. An email may be defined by Request For Comments (RFC) 5322, and optionally at least one of RFC 2045 through RFC 2049. Emails may comprise a header and a body, wherein the header may comprise addressing information and optionally additional tags and metadata (such as DKIM d-tag and DKIM digital signature), and the body may comprise the email message (such as subject and message). The term eMail may be used interchangeably with the term message herein.

American Standard Code for Information Interchange (ASCII)—A character encoding standard for electronic communication. ASCII codes represent text in computing devices 800.

Internet Message Format (IMF)—An email message standard as defined in Request For Comments (RFC) 5322, which is a revision of RFC 2822, which itself superseded RFC 822. IMF only supports text content using ASCII encoding, but may be extended to support other content using MIME.

Multipurpose Internet Mail Extensions (MIME)—An Internet standard that may extend IMF to support text in character sets other than ASCII, as well as attachments, audio, video, images, application programs, and other forms of data compatible with a computing device 800.

Email Message—A message itself and related metadata which may be visible to the end users and is not used to deliver the message.

Display From Address—The email address, as defined in RFC 5322, that is displayed to the end user within their email client (MUA). This address may be contained in the header (meta data) of the email. The MUA may not have access to the SMTP envelope (and thus may not see the 5321.FROM Address address). The Display From Address may be different from the 5321.FROM Address. This address may also be known to a person having ordinary skill in the art as RFC5322.From and header From address. This address may be referred to as 5322.FROM and/or 5322.FROM Address herein.

Addressing Information—Information used to transfer the message from the source to the destination. This information may be defined by SMTP. SMTP is a mail transport and delivery protocol defined in RFC 5321, which superseded RFC 821. Addressing information may be used by Mail Servers in order to relay the message properly, but may not be visible to the end users.

Mail eXchanger (MX)—A record in the Domain Name System (DNS), which may specify which server is responsible for accepting email addresses on behalf of a domain. The host name from the MX record must map to one or more address records (such as A or AAAA records) in the DNS, and must not point to any CNAME records.

Client—A user or a computing device 800 capable of obtaining a service provided by at least one computing device 800 such as, but not limited to a server or a cloud computing platform. Client may comprise, but not limited to the following, and may be used interchangeably herein:

User/End User—Entity that has authority to use an application, equipment, facility, process, or system compatible with a computing device 800 and/or one who consumes or employs a good or service compatible with a computing device 800 to obtain a benefit or to solve a problem. A non-limiting example is a person who may send and/or receive an email. The user may be referred to as user, end user, sending user, sender, receiving user, and/or recipient herein.

Recipient/Receiver—A user and/or computing device 800 that may receive at least one email.

Sender—A user and/or computing device 800 that may send at least one email.

Client Device—A computing device 800 that may access a service made available by another computing device 800 such as, but not limited to a server or a cloud platform. A non-limiting example is a computing device 800 capable of receiving and/or sending email.

Server—An application compatible with a computing device 800 or a computing device 800 that may provide functionality for at least one other program compatible with a computing device 800 or at least one computing device 800, such as a client.

Mail Server—A server that may handle and/or receive and/or send and/or deliver email over a network. Non-limiting examples may comprise SMTP server, POP/POP3 server and IMAP server.

Agent—A digital set running on a client, server, or any other computing device 800. An agent may be referred to as Software and/or a Program and/or Service and/or Application by a person having ordinary skill in the art and may be used interchangeably throughout the present disclosure.

Domain Name System (DNS)—A hierarchical and decentralized naming system for computing devices 800 and/or agents/other resources provided by at least one computing device 800 and connected to a network. DNS may associate various information with domain names assigned to each of the participating entities, such as computing devices 800. Most prominently, it may translate more readily memorized domain names to the numerical IP addresses needed for locating and identifying computer services and devices with the underlying network protocols.

Mail User Agent (MUA)—A program that may provide a GUI to at least one client type for sending and/or receiving email.

Non-limiting examples may comprise desktop applications such as Microsoft's Outlook, and web-based applications (webmail) such as Google's Gmail.

Message Submission Agent (MSA)—A program that may receive at least one email from at least one MUA, check for any errors, and/or transfer the email (for example via SMTP) to the MTA, which may be hosted on the same server.

Mail Transport Agent (MTA)—An application that may receive email from an MSA and/or another MTA. It may find (through, for example, name servers and the DNS) the Mail eXchanger (MX) record from the recipient domain's DNS, in order to find out how to transfer the mail. MTA may then transfer the email (via, for example, SMTP) to another MTA (which may be known as SMTP relaying) or, if the recipient's mail server has been reached, to the MDA.

sending Mail Transport Agent (sMTA)—MTA that performs sending of at least one email. In some embodiments consistent with the present disclosure, an MTA may perform both sending and receiving of at least one email.

receiving Mail Transport Agent (rMTA)—MTA that performs receiving of at least one email. In some embodiments consistent with the present disclosure, an MTA may perform both sending and receiving of at least one email.

MTAs may act as the post office (the sorting area and mail carrier), which handle message transportation. Non-limiting examples may comprise Postfix, Exim, and Sendmail.

Mail Delivery Agent (MDA)—An application that may receive email from the local MTA (which may coexist on the same computing device 800), and may store the email into the appropriate mailbox for future retrieval by a user. MDA may be also known as LDA (Local Delivery Agent).

MDAs may act as mailboxes, which store messages (as much as their volume will allow) until the client checks the mailbox and/or retrieves and/or modifies and/or deletes the mail. It is not necessary for clients to be connected in order to receive email. A non-limiting example is Dovecot, which may include an MDA which receives email from an MTA and delivers it to the server's mailbox. A user may then retrieve the email from the mailbox via, for example, POP3 or IMAP.

Communication Protocol—A defined set of rules and/or regulations that may determine how data may be transmitted in telecommunications and/or computer networking and/or any other type of communication between at least two computing devices 800. May be known to a person having ordinary skill in the art as just protocol. Protocol may be used herein to represent communication protocol unless otherwise noted.

Port—A communication endpoint at the software level, within an operating system. A port is a logical construct that identifies a specific process or a type of network service. Ports may be identified for each protocol and address combination by 16-bit unsigned numbers, commonly known to a person having ordinary skill in the art as the port number. The most common protocols that use port numbers may be the Transmission Control Protocol (TCP) and the User Datagram Protocol (UDP). A port number is always associated with an IP address of a host and the protocol type of the communication. It completes the destination or origination network address of a message. Specific port numbers may be reserved to identify specific services, so that an arriving packet can be easily forwarded to a running agent. For this purpose, the lowest numbered 1024 port numbers identify the historically most commonly used services, and may be called the well-known port numbers. Higher-numbered ports are available for general use by applications and are known as ephemeral ports. When used as a service enumeration, ports may provide a multiplexing service for multiple services or multiple communication sessions at one network address. In the client-server model of application architecture multiple simultaneous communication sessions may be initiated for the same service.

Point to Point Communications (PtP)—A communications connection between two communication endpoints and/or nodes and/or computing devices 800. PtP may be referred to as simply "Point to Point" herein.

Internet Protocol UP)—A principal communications protocol in the Internet protocol suite for relaying datagrams across at least one network of computing devices via the use of packets. Its routing function may enable internetworking, and essentially establishes the Internet. The Internet Protocol may define the format of packets and provides an addressing system.

Datagram—A chunk/portion of some or all of the encapsulated payload data to be transferred over at least one network.

Packet—A unit of data to be transmitted over at least one network comprising metadata and one datagram. Metadata may comprise, but not limited to at least one of the following:
At least one source address,
At least one destination address, and
A checksum to validate the packet integrity Maximum Transmission Unit (MTU)—The size of the largest Protocol Data Unit (PDU) that may be communicated in a single network layer transaction. The MTU relates to, but may not be identical to the maximum frame size that may be transported on the data link layer, such as an Ethernet frame.

Transmission Control Protocol (TCP)—A protocol that may adjust its segment size to be smaller than the MTU. TCP is one of the main protocols of the Internet Protocol suite. It originated in the initial network implementation in which it complemented the Internet Protocol (IP). Therefore, the entire suite may be commonly referred to by a person having ordinary skill in the art as TCP/IP. TCP/IP and TCP may be used interchangeably herein. TCP is connection-oriented, such that a connection between client and server may be established (passive open) before data can be sent. A three-way handshake (active open), retransmission, and/or error-detection may add to reliability but lengthens latency and/or degrade throughput.

User Datagram Protocol (UDP)—Another protocol that is a member of the Internet Protocol suite which may disregard the MTU size, thereby forcing IP to fragment oversized datagrams. UDP may use a simple connectionless communication model with a minimum of protocol mechanisms. UDP may provide checksums for data integrity, and port numbers for addressing different functions at the source and destination of the datagram. UDP has no handshaking dialogues, and thus may expose the data to any unreliability of the underlying network. Therefore, there is no guarantee of delivery, ordering, and/or duplicate protection.

Simple Mail Transfer Protocol (SMTP)—The SMTP protocol is the standard protocol that is defined by RFC 5321, which superseded RFC 821. SMTP may enable email to be transferred from MUAs to an MSA by a PtP (Point to Point) connection. This protocol may operate in online mode, by being encapsulated in a TCP/IP frame. The mail may be sent directly to the recipient's mail server. SMTP protocol works using text commands sent to the SMTP server on port 25 by default (without encryption). Alternatively, port 587 may be used for communication encrypted via Transport Layer Security (TLS). Each command sent by the client may be followed by a response from the SMTP server consisting of a number and a descriptive message. Non-limiting examples of SMTP commands may include the following:

HELO/EDLO—Identification using the IP address or domain name of the originator computer.

MAIL FROM:—Identification of the originator's address, as defined in the RFC 5321. The email address to which bounce messages are delivered. This address is included in the SMTP envelope (data part of the SMTP protocol). It may also be known to a person having ordinary skill in the art as RFC5321.MailFrom, Envelope sender address, Envelope from address, Return Path address, and Bounce address. This address may be referred to as 5321.FROM and/or 5321.FROM Address herein.

While the 5321.FROM Address may be used by the SMTP, the 5322.FROM Address may be used by the MUA to display the address in the Form field.

RCPT TO:—Identification of the recipient's address, as defined in the RFC 5321. This address may be referred to as 5321.TO and/or 5321.TO Address herein.

DATA—Email body which may be in the IMF format as defined by the RFC 5322.

QUIT—Exit the SMTP Server and/or close the TCP/IP connection.

HELP—List of SMTP commands supported by the SMTP Server.

Authentication Method—A process of identifying a user by a set of parameters, such as, but not limited to a valid username and password, Media Access Control (MAC) addresses, and/or IP addresses. Authentication method for send/receiving emails is a technique that may be used to, for example, improve email deliverability (reduce the risk of emails ending up in the recipients' spam folders). It may allow anti-spam filters to better verify the identity of the sender, and/or prevent at least some spoofing and phishing scams. The following are non-limiting examples of email authentication methods:

Sender Policy Framework (SPF)—An email authentication method designed to detect forging sender addresses during the delivery of the email. SPF is limited only to detect a forged sender claimed in the envelope of the email (5321.FROM) which may be used when the mail gets bounced. An SPF policy may enable the sender domain to publicly state which MSA servers, in a form such as, but not limited to server IPs, may send emails on its behalf. The MDA may check if SPF policy exists in the DNS for the domain in the 5321.FROM Address (may be called envelope sender address). If SPF policy exists, the MDA may check if the MSA matches in the list of MSAs specified in the SPF policy. The shortcoming of SPF is that it validates the originating server only looking at the domain in the 5321.FROM Address, not the 5322.FROM Address. The 5321.FROM Address is the email address that receiving servers use to notify the sending server of delivery problems; it may also be referred to by a person having ordinary skill in the art as envelope sender, envelope from, bounce address and/or Return Path address. The problem with this limitation is that the 5322.From address is the only source address that is typically displayed by an MUA, and is therefore may be the only source address shown to recipients.

In some embodiments, SPF in combination with DMARC may be used to detect the forging of the visible sender in em ails (email spoofing), a technique often used in phishing and email spam. SPF allows domain administrators to define which IP addresses are allowed to send mail on the behalf of that domain.

DomainKeys Identified Mail (DKIM)—DKIM provides an encryption key and digital signature that may verify that an email message was not faked or altered. The MSA may store the domain in the d-tag within the email header in the form of, for example, "d=example.com". MSA may also generate a cryptographic hash value, such as, but not limited to MD5 hash value and SHA-256 hash value, of some elements of the email comprising, but not limited to, the body, email header, and/or subject. In some embodiments consistent with the present disclosure, only the body may be used to generate the cryptographic hash value. The generated hash value may be stored in the DKIM signature under the 'bh=' tag in a Base64 standard. The MSA then may hash the DKIM signature (including all the tags the signature comprises), 5322.FROM Address, and/or any headers specified in the "h=" tag in the DKIM signature. The generated hash may then be encrypted via a private key of the sender's domain and inserted into the "b=" tag in a Base64 format. The sender domain stores a public key in a DNS record. The receiving MDA may find the public key from the DNS for that domain. The MDA then uses this public key to decrypt the "b=" tag in order to verify the integrity of the DKIM signature, 5322.FROM Address, and/or headers specified by the "h=" tag by generating a cryptographic hash value and comparing it with the decrypted cryptographic hash value. If the hash values match, the message may not have been tampered with, and the receiver may generate a new cryptographic hash value from some elements of the email comprising, but not limited to, the body, email header, and/or subject, and may compare it with the original cryptographic hash value stored in the "bh=" tag. If they match, the MDA knows that the sending email domain is the owner of that domain, as it may be mathematically almost impossible to spoof a correct DKIM signature that decrypts to the original cryptographic hash value using the public key. Furthermore, the MDA also knows that the elements of the email signed by DKIM were not changed in transit, otherwise the original encrypted cryptographic hash value and the newly generated cryptographic hash value would not match.

The shortcoming of DKIM is that it can only protect mail that has been signed, but it doesn't provide a mechanism to prove that an unsigned message should have been signed.

Domain-based Message Authentication, Reporting and Conformance (DMARC)—DMARC unifies the SPF and DKIM authentication mechanisms into a common framework and allows domain owners to declare how they would like email from that domain to be handled if it fails an authorization test. DMARC is built on top of SPF and DKIM to address the shortcomings of these two authentication standards. DMARC may provide the enforcement of DKIM and/or SPF validation, and confirmation that the 5322.FROM Address is authentic. The DMARC policy may reside in the DNS of the sending domain.

Authenticated Receiver Chain (ARC)—The Authenticated Received Chain (ARC) protocol[31] was developed as an RFC under the umbrella of IETF specifications, similar to the way specifications for SPF, DKIM, and DMARC have been published. The major use cases for ARC may be to: 1) allow intermediary internet mail handlers to communicate authentication assessments across mail domain trust boundaries, and 2) inform message disposition decisions. The latter of these functions may introduce the possibility of DMARC policy overrides. In some embodiments consistent with the present disclosure, DMARC policy may be overridden, for example, but not limited to when the following conditions are true:

The originating domain has published a quarantine or reject policy

Because of authentication-breaking forwarding, the message would otherwise be rendered undeliverable, and Arc is implemented Under ARC, a DMARC processor may be influenced by upstream authentication assessments, then may exercise the option to judge a message as DMARC-compliant despite authentication results made according to strict policy assertions. For example, a receiving domain's MDA may assess a message to have passed DMARC even though it fails both DKIM and SPF using conventional (non-ARC) evaluation. Subsequently, authentication override decisions may be communicated to the originating domain owner and/or originating domain admin. This communication may be facilitated in a DMARC report[16] by, for example, utilizing the PolicyEvaluatedType 'reason' field with justification stated in the PolicyOverrideReason field. Essential to ARC function may be the chain of trust between mail handlers; the degree of trust in a transmitter's assertions about a message's authentication is directly related to the receiver's trust in the transmitter. When this trust is misplaced, the very type of non-legitimate messages that authentication protocols are engineered to protect against may be improperly delivered into an inbox. This is more than hypothetical; it has been realized. While ARC evaluations may attempt to address the deliverability of legitimate, unauthenticated messages, the reliance on trust without proper accreditations may result in malicious messages being delivered to intended victim inboxes.

B. Multiple DKIM Signatures in a Message

Described in RFC 6376 Section 4 are the instructions for interpreting multiple signatures within a message. To quote directly from the source:

A Signer MAY add more than one DKIM-Signature header field using different parameters. For example, during a transition period, a Signer might want to produce signatures using two different hash algorithms.

The aforementioned example situation described may be the dominant expectation of why a single sender would add multiple signatures. Multiple signatures may also occur in messages that have multiple signers; a non-limiting example of this occurs with forwarded emails. In this case, a DKIM signature associated with the domain of the original sender may be attached to the message; subsequently, before the message is forwarded onto the final recipient destination, a DKIM signature associated with the domain of the forwarder may be attached. If a secondary forwarding step were to occur, then another DKIM signature may be attached that is associated with the domain of the second forwarder's domain.

At the time of this writing, it is not obvious that anyone may have formalized the notion of DKIM-signing different versions of a message, such that one of the versions may pass the rigorous DMARC authentication checks. When multiple DKIM signatures exist in a message, only one of them has to generate passing authentication; thus if the sender understands how a legitimate message is likely to modified by an ESP and/or a known forwarder, then signatures for each of the anticipated modified messages may be generated and attached before sending the message.

C. Pre-Signing Messages

The notion of pre-signing refers to the action of generating a DKIM signature for a message incorporated with the modifications that may be performed by a message handling service before being introduced into the message delivery pipeline. In particular, a pre-signed message is one where the following steps may be taken:

1. A signature of the original message may be generated in the conventional manner, as is, then attached,
2. A copy of the message may be constructed with the modifications anticipated to be made by an ESP and/or known-forwarding domain,
3. A signature of the modified copy of the message may be generated and attached to the original message,
4. Steps 2 and 3 may be repeated as needed for scenarios that, for example, may involve modifications to the message retransmitted multiple times, and
5. Send the message with the set of signatures that will individually may be capable of authenticating any anticipated version of the message during the delivery process.

Through DMARC data, the fidelity of a specific set of message alterations performed by an authentication-breaking forwarding server can be tested by using selectors dedicated to that set of alterations. For example, if mail forwarded from 'example.edu' is believed to have the word 'FWD:' prepended to the subject line then a selector, e.g., 's21', could be dedicated to this alteration, then used to send messages directed to any 'example.edu'. Subsequently, the DMARC data for any messages that are forwarded from 'example.edu' may show the authentication status of messages; if those messages are failing SPF while passing DKIM using selector 's21', then the known alteration may be confirmed. Of course, any messages not forwarded from 'example.edu' may pass authentication as usual.

D. Example: Forwarder Modification of Message Subject Line

Suppose that a user has configured their account 'joe@academic.example.edu' to automatically forward received messages to an address under a different domain, 'joe@personal.example.net'. In order to distinguish the message as having been forwarded, the subject line may be purposefully prepended with the text "FWD:".

Furthermore, the sending domain 'example.com' may have implemented the following email security policies:
- An SPF policy that may include the IP used to originally send the message,
- A DKIM public key may be published under selector name 's', and
- A DMARC reject policy.

The message delivery events to the recipient may be as follows:
- The message may be sent from 'bob@example.com' to 'joe@academic.example.edu',
- The original sending MTA may DKIM-sign the message using the private key corresponding to selector name 's' with the public key properly published in the DNS for 'example.com',
- Along with other conventional fields, the DKIM signature may use the subject field,
- SPF authentication may succeed with the sending domain,
- DKIM authentication may succeed with selector 's' and the sending domain, and
- The messages may pass DMARC, and a report may be sent to the authorized report receivers for the sending domain.

The message forwarded delivery events may be as follows:
- The message may be forwarded from, as a non-limiting example, 'joe@academic.example.edu' to, for example, 'joe@personal.example.net',
- SPF authentication may fail at the receiving server since the IP of the forwarder is not in the original sending domain's published SPF policy,
- DKIM authentication may fail at the receiving server since the subject line has been modified so that the message hash differs from the original message hash, and
- Since the original domain may have asserted a DMARC reject policy, and the message does not demonstrate any DMARC aligned validations, the message may not be delivered to the inbox of the forwarded receiver.

E. How Pre-Signing May Improve Message Deliverability:

With all of the previous assumptions in place, further vendor actions may be added:
1. The receiver address 'example.edu' may be recognized as a breaking forwarder with known message modification behavior by, for example, prepending the "FWD:" to the subject line,
2. A copy of the original message may be constructed with the forwarder's modification implemented,
3. A signature of the modified copy of the message may be generated and attached to the original message. This signature could be constructed using the same 's' selector or a different selector with corresponding public and private keys that may be conventionally deployed, and
4. The message now has two DKIM signatures attached by the sending MTA: one for the original message and one for the forwarder-modified message.

The message may still properly authenticate with both SPF and DKIM (with selector 's') at the 'example.edu' server. The following steps may now be performed on the forwarded message receiver's end:
1. The message may be forwarded from 'joe@academic.example.edu' to 'joe@personal.example.net'
2. SPF authentication may fail at the receiving server since the IP of the forwarder is not in the original sending domain's published SPF policy,
3. DKIM authentication may pass with the 's2' selector, which may correspond to the key used to sign the forwarder-modified message, and
4. The original domain may have asserted a DMARC reject policy, and since the message passes DKIM validation, the message may be delivered to the inbox of the forwarded receiver.

Embodiments of the present disclosure may comprise methods, systems, and a computer readable medium comprising, but not limited to, at least one of the following:
A. A Domain Module 160;
B. An Interface Module 170; and
C. A Processing Module 180.

In some embodiments, the present disclosure may provide an additional set of modules for further facilitating the software and hardware platform. The additional set of modules may comprise, but not be limited to:
D. An Artificial Intelligence (AI) Module 190.

Details with regards to each module is provided below. Although modules are disclosed with specific functionality, it should be understood that functionality may be shared between modules, with some functions split between modules, while other functions duplicated by the modules. Furthermore, the name of the module should not be construed as limiting upon the functionality of the module. Moreover, each component disclosed within each module can be considered independently without the context of the other components within the same module or different modules. Each component may contain language defined in other portions of the present disclosure. Each component disclosed for one module may be mixed with the functionality of another module. In the present disclosure, each component can be claimed on its own and/or interchangeably with other components of other modules.

The following depicts an example of a method of a plurality of methods that may be performed by at least one of the aforementioned modules, or components thereof. Various hardware components may be used at the various stages of operations disclosed with reference to each module. For example, although methods may be described to be performed by a single computing device, it should be understood that, in some embodiments, different operations may be performed by different networked elements in operative communication with the computing device. For example, at least one computing device 800 may be employed in the performance of some or all of the stages disclosed with regard to the methods. Similarly, an apparatus may be employed in the performance of some or all of the stages of the methods. As such, the apparatus may comprise at least those architectural components as found in computing device 800.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed without altering or deterring from the fundamental scope of the depicted methods and systems disclosed herein.

Allowed Anticipated Change Generation Method 2100 (Illustrated by FIG. 2A)
1. Receiving an action indication from a user, a system, or AI, for creation and/or modification and/or deletion and/or finish of allowed anticipated changes for a current domain 2110,
   a. If the action indication is for creation:
      i. Create a blank list of allowed anticipated changes 2111, and
      ii. Set continuation indication to creation 2112,
   b. If the action indication is for modification:
      i. Retrieve a specification of allowed anticipated changes list for modification from the user 2115, and
      ii. Prompt user for a continuation indication 2116, wherein the continuation indication may comprise prompting the user if they would like to create another anticipated change, modify existing anticipated change, delete existing anticipated change, or finish,
         1. If create another anticipated change, set continuation indication to creation 2116*a*,
         2. If modify existing anticipated change, set continuation indication to modification 2116*b*,
         3. If delete existing anticipated change, set continuation indication to deletion 2116*c*, and
         4. If finish, go to step 3,
   c. If the action indication is for deletion:
      i. Retrieve a specification of allowed anticipated changes list for deletion from the user 2113,
      ii. Delete the specified allowed anticipated change from the domain 2114, and
      iii. Go to Step 1,
   d. If the action indication is for the finish process, go to step 4;
2. Loop through the following steps 2120:
   a. Preparing for action 2121,
      i. If the continuation indication is for creation:
         1. Generate a blank anticipated change 2121*a*, and
         2. Set the blank anticipated change as a current anticipated change 2121*b*,
      ii. If the continuation indication is for modification:
         1. Receive and specification of an anticipated change for modification from the user 2121*c*, and
         2. Set the specified anticipated change as the current anticipated change 2121*d*,
      iii. If the continuation indication is for deleting:
         1. Receive and specification of an allowed anticipated change for deletion from the user 2121*e*,
         2. Delete the specified allowed anticipated change 2121*f*, and
         3. Go to step 2d,
   b. Receive anticipated change metadata and anticipated change indication parameters for the current anticipated change from the user 2122,
      i. Wherein anticipated change metadata may be for administrative purposes, comprising fields such as, but not limited to at least one of the following:
         1. Name of the change,
         2. Creation date/time,
         3. Modification date/time,
         4. Activation status of the change, and
         5. Approval status of the change, and
      ii. Wherein anticipated change parameters may define the allowed change, comprising fields such as, but not limited to at least one of the following:
         1. Section where the change may reside, such as body or subject,
         2. Change type, such as addition, removal, or modification,
         3. Old string (to remove/modify),
         4. New string (what can be added or be a result of a modification),
         5. Location of the change, such as, but not limited to a location at the end of the subject section or after every comma, and
   c. Set of modifier parameters, such as, but not limited to the following:
      i. Repetition parameters, wherein repetition parameters may affect if an approved change is repeated. As a non-limiting example, if the New String is "FWD:", multiple forwarders may each add it, resulting in "FWD: FWD: FWD: . . . ". In such a case, it may be desired to approve multiple repetitions without creating a separate anticipated change for every combination. Repetition parameters may comprise, but not limited to the following:
         1. Repetition processing activation,
         2. Maximum number of repetitions,
         3. Minimum number of repetitions,
         4. Separator string, and
         5. Section where to locate the repetition, and
      ii. Custom macro. Wherein the custom macro may comprise a custom computing device 800 code compatible with the platform 100, capable of processing input data, such as anticipated change parameters, and generate output data such as additional anticipated change parameters,
   d. Save current anticipated change 2123:
      i. If the continuation indication is for creation:
         1. Add current anticipated change to the list of allowed anticipated changes 2123*a*, and
      ii. If the continuation indication is for modification:
         1. Replace the specified anticipated change with the current anticipated change In the list of allowed anticipated changes 2123*b*, and
   e. Prompt user for a continuation indication 2124, wherein the continuation indication may comprise prompting the user if they would like to create another anticipated change, modify existing anticipated change, delete existing anticipated change, or finish:
      i. If create another anticipated change, set continuation indication to creation, ii. If modify existing anticipated change, set continuation indication to modification,
iii. If delete existing anticipated change, set continuation indication to modification, and
iv. If finish, go to step3;
3. Store the list of allowed anticipated changes on the current domain 2130 via, for example, a database, group policy, networked attached storage, and/or any other medium compatible with a computing device 800;
4. Prompting the user for indication for continuation 2140, wherein prompting the user comprises the following:
   a. Presenting the user with a UI where the user may indicate that they wish to continue, or they are finished, and
   b. Receiving the indication for continuation, wherein receiving the indication for continuation comprises restarting the method.

Allowed Anticipated Change Processing Method 2200 (Illustrated in FIG. 2B)
1. Retrieving a list of anticipated changes from the datastore provided by the domain module 2210;
2. Retrieving anticipated change metadata and anticipated change indication parameters associated with each anticipated change in the list of anticipated changes 2220:
   a. Wherein retrieving anticipated change metadata may be for administrative purposes, comprising fields such as, but not limited to at least one of the following:
      i. Name of the change,
      ii. Creation date/time,
      iii. Modification date/time,
      iv. Activation status of the change, and
      v. Approval status of the change, and
   b. Wherein retrieving anticipated change parameters may define the allowed change at least one computing system 800, comprising fields such as, but not limited to at least one of the following:
      i. Section where the change may reside, such as body or subject,
      ii. Change type, such as addition, removal, or modification,
      iii. Id string (to remove/modify),
      iv. New string (what can be added or be a result of a modification),
      v. Location of the change, such as, but not limited to a location at the end of the subject section or after every comma, and
      vi. Set of modifier parameters, such as, but not limited to the following:
         1. Repetition parameters, wherein repetition parameters may affect if an approved change is repeated. As a non-limiting example, if the New String is "FWD:", multiple forwarders may each add it, resulting in "FWD: FWD: FWD: . . . ". In such a case, it may be desired to approve multiple repetitions without creating a separate anticipated change for every combination. Repetition parameters may comprise, but not limited to the following:
            a. Repetition processing activation,
            b. Maximum number of repetitions,
            c. Minimum number of repetitions,
            d. Separator string, and
            e. Section where to locate the repetition, and
         2. Custom macro. Wherein the custom macro may comprise a custom computing device 800 code compatible with the platform 100, capable of processing input data, such as anticipated change parameters, and generate output data such as additional anticipated change parameters;
3. Retrieving a message for processing 2230 from, for example, the MSA:
   a. In some embodiments consistent with the present disclosure, the message may be retrieved from another source, such as, but not limited to an MUA;
4. Filtering approved and activated anticipated changes from the list of anticipated changes based on the anticipated change metadata associated with each anticipated change in the list of anticipated changes;
5. For each approved and activated anticipated change in the list of the approved and activated anticipated changes, performing the following 2250:
   a. Creating a subsequent message by cloning the message 2252,
   b. Modifying the subsequent message by applying the anticipated change to the subsequent message 2254,
      i. Wherein applying the anticipated change to the subsequent message may comprise at least one of the following:
         1. Executing at least one anticipated change parameter associated with the anticipated change on the subsequent message 2254A,
         2. Providing another system with the required data to apply the anticipated change to the subsequent message 2254B,
            a. wherein providing another system with the required data to apply the anticipated change to the subsequent message may comprise at least one of the following:
               i. Providing an AI system with the required data to apply the anticipated change to the subsequent message,
               ii. Providing raw data, such as, but not limited to the subsequent message and anticipated change parameters associated with the anticipated change, and
               iii. Providing instructions compatible and the subsequent message to another system by generating the instructions based on the anticipated change parameters, and
            b. wherein providing another system with the required data to apply the anticipated change to the subsequent message may comprise providing the required data to, for example, at least one of the following:
               i. AI system,
               ii. A data processing algorithm,
               iii. Cloud platform,
               vi. At least one human, and
               v. A third party data processor, and
   c. Adding the subsequent message to a list of processed messages 2256; and
6. Providing the list of processed messages 2260 to, for example, the MSA:
   a. In some embodiments consistent with the present disclosure, the list of processed messages may be provided to another source, such as, but not limited to the following:
      i. A provider of the message for processing,
      ii. The MUA, iii. The domain,
iv. A third part and/or client, and
v. The AI Module for, for example, training purposes.

Message Sending Method 3100 (Illustrated by FIG. 3)
1. Receiving, from an MUA, a composed message for sending 3110:
   a. Wherein the message may be composed by a user;
2. Transferring the message from the MUA to an MSA 3120;
3. DKIM signing the message 3130 via, for example, the MSA:
   a. Wherein DKIM signing comprises DKIM signing the message by performing the DKIM Signing Method 6100 in order to generate a DKIM signature;
4. Adding, via, for example, the MSA, the DKIM signature to a list of signatures to be sent along with the message 3140;
5. Retrieving, via, for example, the MSA, a list of allowed anticipated changes 3150;
6. For each allowed anticipated change in the list of the allowed anticipated changes, performing, via, for example, the MSA, the following steps 3160:
   a. Editing the message with the allowed anticipated change 3163 by, for example, performing Allowed Anticipated Change Processing Method 2200 provided by the processing module,
   b. Generating a subsequent DKIM signature for the edited message 3166 by, for example, performing the DKIM Signing Method 6100, and
   c. Adding the subsequent DKIM signature to the list of signatures for inclusion in the message 3169;
7. Adding, via, for example, the MSA, the list of DKIM signatures to a header of the message;
8. Transferring the message from, for example, the MSA to an sMTA for delivery.

Although the aforementioned methods have been described to be performed by the platform 100, MSA, and MUA, it should be understood that a computing device 800 may be used to perform the various stages of at least one method. Furthermore, in some embodiments, different operations may be performed by different networked elements in operative communication with the computing device 800. For example, a plurality of computing devices 800 may be utilized in the performance of some or all of the stages in the aforementioned methods. Moreover, a plurality of computing devices 800 may be configured much like a single computing device 800. Similarly, an apparatus may be employed in the performance of some or all stages in the method. The apparatus may also be configured much like computing device 800.

The present disclosure provides examples and is illustrative only unless otherwise stated. Accordingly, the present disclosure should not be considered to be limiting to the illustrative examples provided. Further, features and/or variations may be provided in addition to those set forth herein. For example, embodiments may be directed to various feature combinations and sub-combinations described in the present disclosure.

II. Platform Configuration

Figure 1B:
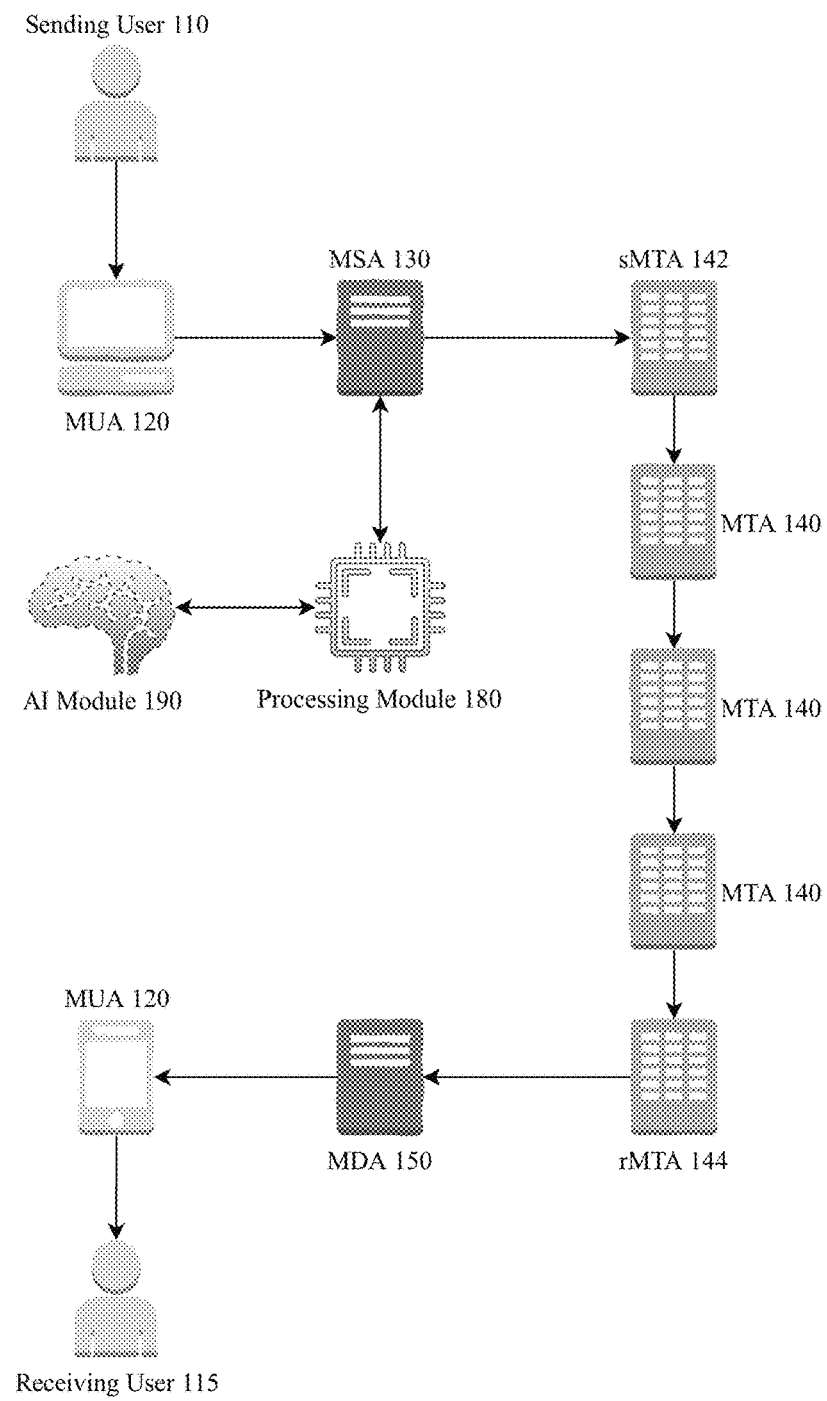
Figure 1C:
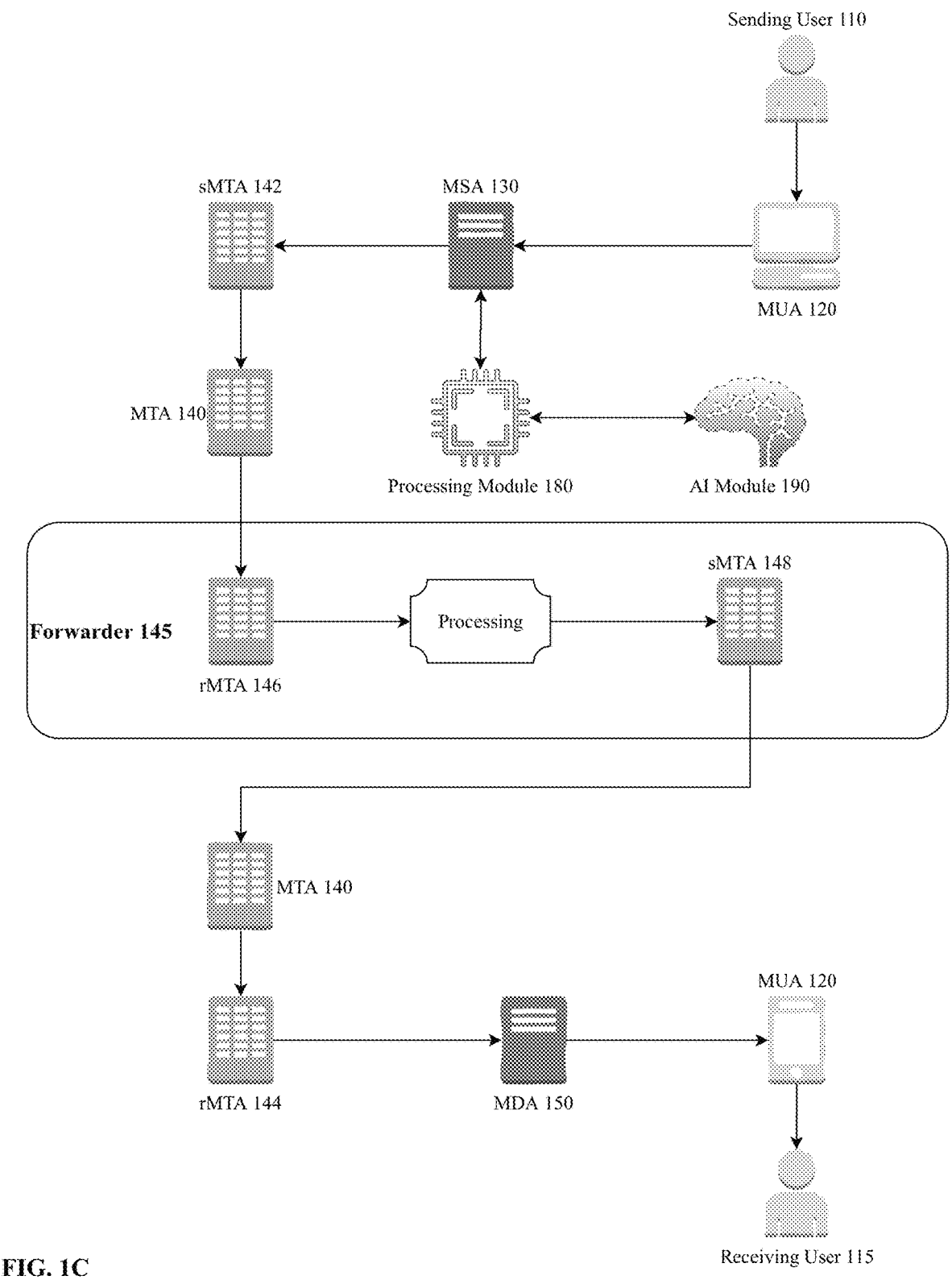

In some embodiments consistent with the present disclosure, the platform 100 may be provided. In some embodiments, the platform 100 may be configured to securely send authenticated messages while preserving data integrity. In some embodiments, a message may be altered with at least one allowed anticipated change during transmission without negatively impacting security, authenticity, or data integrity of the message. As illustrated in FIG. 1A, the platform 100 may comprise, but not limited to, the following modules: a domain module 160, an interface module 170, a processing module 180, an AI module 190, at least one MUA 120 and an admin console 113. In some embodiments, the domain module 160 may comprise, but not limited to, DNS, Datastore, an MSA 130, an MDA 150, and an MTA 140. In some embodiments, the MTA 140 may comprise at least one of sMTA 142 and rMTA 144, as depicted in FIG. 1B. Furthermore, FIGS. 1B and 1C illustrate the flow of the message from the sending user 110, to the receiving user 110. FIG. 1C further illustrates interception and possible alteration of the message by, for example, a forwarder 145. In some embodiments consistent with the present disclosure, the following may not be comprised by the platform 100:
At least one MTA 140, including rMTA 144;
An MDA 150;
At least one MUA 120; and
An entire platform utilized by the receiving user 115.

In some embodiments consistent with the present disclosure, the forwarder 145 may not alter the message, thereby preserving the security, authenticity, and data integrity of the message. In other embodiments, the forwarder 145 may alter the message consistent with at least one digital signature, such as DKIM signature, embedded in the message. In such scenarios, the security, authenticity, and data integrity of the message may also be preserved. In yet other embodiments, the forwarder 145 may alter the message in a way that may not be represented by at least one digital signature embedded in the message, corresponding to at least one allowed anticipated change. In such scenarios, the authenticity and/or data integrity of the message may be compromised, and the message may fail authentication, such as DKIM authentication (method 6200) and/or DMARC authentication (method 7100).

FIGS. 1A, 1B and 1C illustrate possible operating environments, through which a platform 100 consistent with embodiments of the present disclosure may be provided. By way of non-limiting example, a platform 100 may be hosted on, for example, a cloud computing service. In some embodiments, the platform 100 may be hosted on at least one computing device 800. A user 110 may access platform 100 through a software application and/or hardware device. The software application may be embodied as, for example, but not be limited to, a website, a web application, a desktop application, and a mobile application compatible with the computing device 800.

Accordingly, embodiments of the present disclosure provide a software and hardware platform comprised of a distributed set of computing elements, including, but not limited to:

A. Interface Module
   Integrates the platform 100 with at least one of the following:
      MUA
      Domain Module
      User Console
         Computing device 800 utilized by the user
      Admin Console
         Computing device 800 utilized by the Administrator
      AI
   Provides creation/modification/deletion/activation of at least one allowed anticipated change May comprise at least one of the following:
- Web Page/Webapp
- Locally installed app on user/admin console
- API B. Processing Module
- Retrieves allowed anticipated change list from Domain
  - List may be chosen based on least one of the following:
    - Sending user/email
    - Current domain
    - Receiving email
    - Receiving domain
    - Domain Group Policy
    - AI
    - Pre-existing dataset, such as a third party dataset identifying spamming domains
    - Web Scraping
- Receives message for processing from MSA
- Processes allowed anticipated change list
  - For each change:
    - Modify message
    - Generate DKIM signature for modified message
    - Add generated signature to the list of signatures to be included in the message
- Send the list of signatures to the MSA
- Optional: Allow the user to define allowed anticipated changes at the time of message composition through the MUA C. Domain Module
Responsible for:
- Sending/Receiving/Processing email
- MSA/MTA/MDA
- DKIM
- SPF
- DMARC
- DNS
  - MX
  - Text
  - A
- Datastore
  - Allowed anticipated change list
- Administration
  - Add/modify/create/delete users/email addresses
  - Add/modify/create/delete allowed anticipated change list
  - Rule enforcement, such as group policy
- Authentication
  - POP/IMPA/SMTP
- Integration between MUA and MSA/MDA D. AI Module
AI for automatic change selection/generation comprising:
- Generation of anticipated changes
- Processing of anticipated changes
- Training based on:
  - Domain Group Policy
  - Monitoring of user selections
  - Pre-existing dataset, such as a third party dataset identifying spamming domain
  - Web Scraping
- Activation based on at least one of the following:
  - Scheduled run to define allowed anticipated change lists and metadata
  - Activation via interface module
  - Activation via processing module
  - Optional: At the time of sending the message for realtime change selection/generation III. Platform Operation Email Message Authentication Protocols Most if not all reputable email inbox providers may attempt to authenticate an email message delivered to a recipient's Mail Delivery Agent (MDA) prior to placing it in the recipient's inbox. The authentication protocols commonly used may be the Sender Policy Framework (SPF), DomainKeys Identified Mail (DKIM), and Domain-based Message Authentication, Reporting, and Conformance (DMARC). A domain owner can use these to assert permissions and claim ownership of email messages sent across the internet. To function, these may be published as policies in the domain's Domain Name System (DNS). In turn, authenticating inbox servers may interrogate the alleged message sender's domain to validate the sender's authorization.

SPF authorizes messages based on the SMTP 5321.From address within the message. The majority of email clients by default may not expose the 5321.From address of a message to the inbox user. What normally may show in the Mail User Agent (MUA), i.e. a user's inbox view, is the 5322.From address, colloquially may be known to a person having ordinary skill in the art as the 'friendly from' address, associated with the Internet Message Format (IMF). It can be trivial to change the friendly-from address to any email identity making impersonation of known or reputable senders a common threat to users of email. Furthermore, by having SPF authentication in place for the 5321.From address and deliberately altering the 5322.From address, a message can more-reliably impersonate someone while passing authentication.

DKIM protocols may be based on message authorization utilizing the 'd=' tag in the header. Similarly, this detail is not usually exposed in an email client interface. Thus, an impersonated 5322.From address may still pass DKIM authentication with a distinct DKIM domain specified. For example a message signed with DKIM specifying 'd=example.com' as the source domain, with the corresponding public key properly situated in that domain's DNS, and a 5322.From address of 'example.net' would appear in the recipient's email client as being From 'example.net' and pass DKIM.

These vulnerabilities with using SPF and DKIM authentication alone may be substantially addressed by coupling them with DMARC. A message will not pass DMARC authentication unless SPF or DKIM checks can pass DMARC alignment checks. Individually, these may be, but not limited to the following:
- DMARC aligned SPF validation means:
  - the 5321.From address passes the corresponding authentication checks, and
  - the 5321.From address aligns with the 5322.From address.
- DMARC aligned DKIM validation means:
  - the domain specified in the 'd=' tag passes the corresponding authentication checks, and
  - the 'd=' specified domain aligns with the 5322.From address.

Thus, if the domain within the 5322.From address is unauthorized, the DMARC authentication check should fail. DMARC further asserts the intent of the domain owner in the case where message authentication fails. In particular, policy assertions that a domain owner can publish may comprise the following:
- monitoring-only—no specific actions may be taken with messages that fail authentication;

quarantine—any message that fails authentication should be considered suspicious and may be subject to further scrutiny; and reject—any message that fails authentication may not be delivered.

In addition to the policy settings in the aforementioned list, the domain owner can publicize an email address to which DMARC reports about message handling can be sent. A DMARC report may include, but not limited to the IP from which the message was sent and the various SPF and DKIM authentication results. This may provide the domain owner with visibility into the organization's sending infrastructure and may reveal non-legitimate sending as well. A monitoring-only policy may be the first step for domain owners; it does not instruct the inbox provider to take action against non-authenticated messages. The typical action that may be taken by inbox providers when a message fails authentication and the domain asserts a quarantine policy is to deliver the message to the spam folder. If a domain has published a DMARC reject policy, then messages from unauthorized sources that use the domain's name in either of the message from-addresses should not be delivered to any inbox or spam folder. This may help to protect the reputation of the organization and its employees, vendors, customers, and anyone who might fall victim to messages that impersonate the domain via email.

More details about DKIM

The history of digital signatures begins with the 1976 conjecture by Whitfield Diffie and Martin Hellman about the existence of such methods then with the invention of the RSA algorithm, which provided a crude first effort. U.S. Pat. No. 5,537,475A covers digital signature algorithms and their use. The origins of DKIM lie in U.S. Pat. No. 6,986,049 submitted in September 2003 and granted January 2006 covers the first description of how to use public-private key cryptography for the purposes of email authentication. The idea was first published as an Internet Engineering Task Force (IETF) Request For Comments (RFC) in 2007 as RFC 4870 and RFC 4871, and has gone through multiple updates and revisions since. With DKIM, a message receiver can check that an email alleged to have been sent on behalf of a specific domain is authorized by the owner of that domain. This may be accomplished by attaching to each outbound email message a digital signature that can be associated specifically with a domain name. The message recipient can verify this using the sending domain's published public key to validate the attached signature.

An attached DKIM signature may further guarantee the integrity of the message body and specified set of message headers, i.e., that those components have not been altered. As such, DKIM may provide non-repudiation of messages, and in the global scope of message quality assessments, may provide a mechanism to detect illicit activity such as, but not limited to, phishing and improper spam messages. One of the well-known weaknesses of DKIM may be realized when many legacy email services forward messages; specifically, such forwarding/retransmitting services have historically altered parts of the message that often are specified to be part of the attached signature, i.e., the DKIM authentication will be broken by the rewriting actions that mail forwarder's/retransmitter's may perform.

When Legitimate Messages Fail to Authenticate with DMARC-Aligned DKIM

An indirect mail flow is one where a message does not flow from the author's domain directly to a recipient's domain. In those situations where the originating domain has published a strict DMARC reject policy, legitimate-message deliverability can be impacted if the intermediary participants in the mail handling process do not respect the validating information integrated into the message, e.g., alteration of content used by the sending server to DKIM-sign the message, altering any of the From addresses, or modifying content of the message body.

The current abilities for third-party ESPs to properly authenticate messages sent through their platform using the client organization's proper From address are inconsistent. Some may be capable of sending on behalf of an organization's domain such that proper DMARC-aligned SPF and/or DKIM authentications can be realized. Others are either incapable of any DMARC-respecting sending or may require great technical effort and/or expense to configure the service for such.

Non-Compliant Third Party Email Senders

Common uses for an organization to use an external ESP may include management and execution of email marketing campaigns, recruiting new personnel, and newsletter distribution. Many of the service providers may have a vested interest in the intelligence that can be gathered from responses to individual messages in a sending campaign. An important example of this is the monitoring of the message bounce rate, i.e., the ratio of the number of messages that bounce to the total number of messages sent. There may be a variety of reasons for why a message will bounce, including but not limited to:

the delivery address does not exist;

the message size exceeds a configured or specification threshold;

the receiving domain believes the message is spam and refuses to deliver to an inbox; and the message is actively reported as spam by the receiver.

Having a significant portion of sent messages improperly bounce may cause problems for the reputation of the sending server, e.g., the IP could be placed onto a spam blacklist which may impact the deliverability of future sending for the ESP's other customers.

A prevailing method to facilitate monitoring of message bounce activity is for the ESP to not use the 5321.From address with the client's domain but to one controlled by the ESP. Subsequently, having the client's 5322.From address unaligned with the ESP's 5321.From address will cause DMARC-aligned SPF authentication to fail. It may still be possible for the ESP to sign the message with a private key dedicated to the client who would publish the public key in their own DNS. In such cases and if done properly, the message can pass DMARC-aligned DKIM authentication.

The sentiment of ESPs regarding DMARC-aligned for their clients is inconsistent, at best. Some providers may use proper 5321.From addresses, whereby an SPF policy published by the client authorizing the ESP to send on its behalf could function to pass DMARC authentication. Because of the problems that bad deliverability can cause and the convenience by which bounce detection helps deter such problems, many ESPs may insist on using an unalignable 5321.From address for sending client emails. Many ESPs may not be capable of handling DKIM in a way that facilitates a passing DMARC check at the client's domain. In short, some can do SPF but not DKIM, some can do DKIM but not SPF, some can do both, some can do neither. This is most unfortunate for the organization that requires (i) the services of the ESP and (ii) strict DMARC reject policy protections on their domains.

Email Forwarding

There are situations where the intended message recipient will have configured all received messages to be forwarded to an inbox email address under a different organizational domain. A common scenario for this may involve alumni email accounts for graduates of academic institutions. Authorized MUA access to these alumni email accounts should not persist after graduation; instead, they may be configured to forward to a different email address chosen by the graduate. For example, a message delivered to joe@example.edu could be configured to be automatically forwarded to joe@example.net.

When a message is forwarded in this way, the envelope 5321.From address may be altered to reflect the forwarder's address. Since the forwarder's sending IP may not be authorized by the original sender's SPF policy, an SPF authentication at the forwarded destination's domain will fail. On the other hand, DKIM authentication may be able to survive though this depending on the specifics of the forwarding mail server's implementation. In particular, since a DKIM signature is based on the hash value of a specified subset of the message header fields and/or the message body, if any of the aforementioned fields and/or message body are altered, then the original signature will not pass the validation step. A common example of this is prepending strings such as '[EXTERNAL]' and '[FWD]' to the 5322.From field of the message. Since this 5322.From field is required to be one of the fields used in the message hash, it is guaranteed that the hash generated will differ from the attached signed hash, thereby causing the authenticating server to interpret the message as unauthorized even in the case where the message may be legitimate. Another common alteration may occur in the body of the message, where a forwarder may add a content trailer to the top or bottom of a message, in order to provide information about the delivery pathway, e.g., appending the string '--sent from example.com ----------'.

For the administrator who may assert a strict DMARC reject policy for their domain, deliverability of forwarded emails can be a costly problem. Consider an email marketing campaign where the number of delivered emails can be correlated to a positive-valued revenue statistic. All of the emails that become undeliverable due to breaking forwards may result in decreased revenue. This along with other nuances and complexities of implementing good domain identity protection have been a barrier to adoption of strict reject policies.

Authenticated Receiver Chain (ARC)

An attempt to address the problem of forwarded emails being non-authenticatable, the Authenticated Received Chain (ARC) protocol was developed as an RFC under the umbrella of IETF specifications, similar to the way specifications for SPF, DKIM, and DMARC have been published. The non-restrictive major use case examples for ARC may be to allow intermediary internet mail handlers to:

communicate authentication assessments across mail domain trust boundaries, and inform message disposition decisions.

The latter of these functions introduces the possibility of DMARC policy overrides, especially when the originating domain has published a quarantine or reject policy, where because of authentication breaking forwarding, the message may otherwise be rendered undeliverable.

Under ARC, a DMARC processor can be influenced by upstream authentication assessments, then exercise the option to judge a message as DMARC-compliant despite authentication results made according to strict policy assertions. For example, a receiving domain's MDA can assess a message to have passed DMARC even though it fails both DKIM and SPF using conventional (non-ARC) evaluation.

Subsequently, authentication override decisions can be communicated to the originating domain owner. This communication can be facilitated in a DMARC report by utilizing the PolicyEvaluatedType 'reason' field with justification stated in the PolicyOverrideReason field.

Essential to ARC function may be the chain of trust between mail handlers; the degree of trust in a transmitter's assertions about a message's authentication may be directly related to the receiver's trust in the transmitter. When this trust is misplaced, the very type of non-legitimate messages that authentication protocols are engineered to protect against can be improperly delivered into an inbox. This is more than hypothetical, as it has been realized in practice. While ARC evaluations attempt to address the deliverability of legitimate but non-authenticatable messages, the reliance on trust without proper accreditation of foundations can result in malicious messages being delivered to intended victim inboxes.

Threat Models for DKIM

In some instances, DKIM pre-signing may not enhance any existing vulnerabilities that could compromise the information security of a signed message. The security of the message authorization provided by DKIM signature may rely on the following non-limiting examples:

the infeasibility of generating the same hash value for two different inputs: one is the original message and the other is the message of an attacker; and the strength of the public-key cipher used to encrypt the hash.

The act of forging a DKIM cryptographic signature may be an intractable task when reasonable practices are used. With a properly functioning public key published in the domain owner's DNS, in order to forge a signature with altered message contents and hash, one would need to crack the signing server's private key. Since pre-signing uses the same hash-and-encrypt process as conventional DKIM signing, the security risks that would otherwise be exposed during standard (and probably not best) DKIM practices would not be increased.

In summary, with regard to known vulnerabilities there are no increased risks to message security when using pre-signing. Furthermore, no new vulnerabilities to be introduced with pre-signing when sound practices are used are known or expected.

DNS Attacks

An often overlooked vulnerability in existing message authentication processes is non-secure DNS. Without irrefutable assurances that an authenticating server is querying the message-originating domain's DNS, there is no guarantee that the cryptographic public key found by the authenticating server was not engineered to establish fake legitimacy of a malicious message. The sequence of events for such a DNS-spoofing scenario, for example, may be the following:

1. The domain example.net has published a DMARC reject policy.
2. A malicious message with a forged from address of ceo@example.net is sent to user@example.com and signed with a DKIM key of selector name x.
3. The MDA for example.com initiates a query for the public DKIM key for domain example.net.
4. The domain lookup is intercepted by poisoned by a compromised DNS server, which declares example.net to be found at the attacker's IP.
5. The attacker's server is situated with the attacker's key.
6. Before the legitimate DNS query can return, the attacker immediately intercepts the DNS query and immediately responds with forged DNS data containing its own public key that will properly decrypt the signature hash.
7. The MDA decrypts the hash then compares to its own calculated hash and determines that the message is authorized.
8. The message gets delivered to the user's inbox and looks authentic.

A common way for querying agents to guarantee the identity of the domain being queried may be through technology such as, but not limited to, Domain Name System Security Extensions (DNSSEC) technology. DNSSEC is a set of extensions added to existing DNS that provide cryptographic authentication of DNS data, denial of existence, and data integrity. Like email, DNS was not originally designed to carry any identity security. If a domain's DNS server does not have a way to cryptographically guarantee its identity, then the results of DNS queries directed toward that domain may have some degree of associated uncertainty.

The technique of pre-signing may be independent of the manner by which the DNS server for a domain operates. If the signature from pre-signing a message is vulnerable in this way, then so is any DKIM signature attached to the message and associated with the domain.

Improper Body Length Specifications

Part of the DKIM header information may be the body hash, the 'b=' tag. Corresponding to this may be the ability to specify a body length option using the 'l=' tag. The original intent of this is to provide a way to validate that part of a message that will not be modified when sent through a mailing list. Such modifications may include a possible inclusion of an 'Unsubscribe' link appended to the bottom of a message. Conventional use of this option can allow an attacker to insert malicious content into the message. By defeating the user agent's duplicate message detection, the original message content may never be visible to the recipient. It is suggested in the DKIM specification that signers should be wary of using the body length tag and verifiers may choose to ignore signatures that use them.

Embodiments of the present disclosure provide a hardware and software platform, operative by a set of methods and computer-readable media comprising instructions configured to operate the aforementioned modules and computing elements in accordance with the methods. The following depicts an example of at least one method of a plurality of methods that may be performed by at least one of the aforementioned modules. Various hardware components may be used at the various stages of operations disclosed with reference to each module.

For example, although methods may be described to be performed by a single computing device 800, it should be understood that, in some embodiments, different operations may be performed by different networked elements in operative communication with the computing device 800. For example, at least one computing device 800 may be employed in the performance of some or all of the stages disclosed with regard to the methods. Similarly, an apparatus may be employed in the performance of some or all of the stages of the methods. As such, the apparatus may comprise at least those architectural components as found in computing device 800.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

Figure 2A:
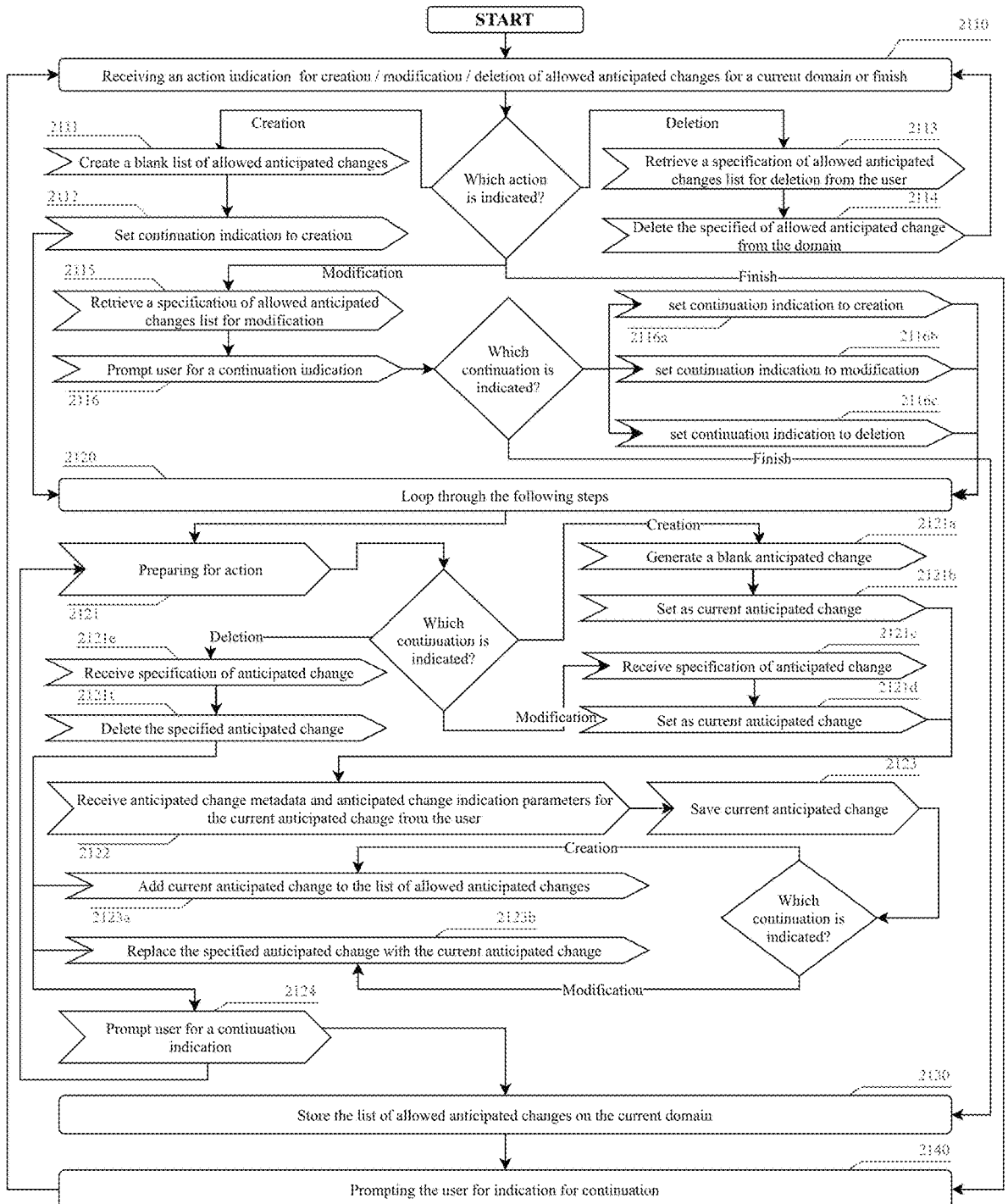
FIG. 2A is a flow chart of a method for providing Allowed Anticipated Change Generation Method 2100.

2100 Allowed Anticipated Change Generation Method (Illustrated by FIG. 2A)

Consistent with embodiments of the present disclosure, a method may be performed by at least one of the aforementioned modules. The method may be embodied as, for example, but not limited to, computer instructions, which when executed, perform the method. The method may comprise the following stages:

1. Stage 1 2110: Receiving an action indication from a user, a system, or AI, for creation and/or modification and/or deletion and/or finish of allowed anticipated changes for a current domain,
    a. If the action indication is for creation:
        i. Create a blank list of allowed anticipated changes 2111, and
        ii. Set continuation indication to creation 2112,
    b. If the action indication is for modification:
        i. Retrieve a specification of allowed anticipated changes list for modification from the user 2115,
        ii. Prompt user for a continuation indication 2116, wherein the continuation indication may comprise prompting the user if they would like to create another anticipated change, modify existing anticipated change, delete existing anticipated change, or finish,
            1. If create another anticipated change, set continuation indication to creation 2116a,
            2. If modify existing anticipated change, set continuation indication to modification 2116b,
            3. If delete existing anticipated change, set continuation indication to deletion 2116c, and
            4. If finish, go to step 3,
    c. If the action indication is for deletion:
        i. Retrieve a specification of allowed anticipated changes list for deletion from the user 2113,
        ii. Delete the specified allowed anticipated change from the domain 2114, and
        iii. Go to Step 1,
    d. If the action indication is for the finish process, go to step 4;
2. Loop through the following steps 2120:
    a. Preparing for action 2121:
        i. If the continuation indication is for creation:
            1. Generate a blank anticipated change 2121a, and
            2. Set the blank anticipated change as a current anticipated change 2121b,
        ii. If the continuation indication is for modification:
            1. Receive and specification of an anticipated change for modification from the user 2121c, and
            2. Set the specified anticipated change as the current anticipated change 2121d,
        iii. If the continuation indication is for deleting:
            1. Receive and specification of an allowed anticipated change for deletion from the user 2121e,
            2. Delete the specified allowed anticipated change 2121f, and
            3. Go to step 2d,
    b. Receive anticipated change metadata and anticipated change indication parameters for the current anticipated change from the user 2122:

i. Wherein anticipated change metadata may be for administrative purposes, comprising fields such as, but not limited to at least one of the following:
1. Name of the change,
2. Creation date/time,
3. Modification date/time,
4. Activation status of the change, and
5. Approval status of the change, and ii. Wherein anticipated change parameters may define the allowed change, comprising fields such as, but not limited to at least one of the following:
1. Section where the change may reside, such as body or subject,
2. Change type, such as addition, removal, or modification,
3. Old string (to remove/modify),
4. New string (what can be added or be a result of a modification),
5. Location of the change, such as, but not limited to a location at the end of the subject section or after every comma, and
6. Set of modifier parameters, such as, but not limited to the following:
   a. Repetition parameters, wherein repetition parameters may affect if an approved change is repeated. As a non-limiting example, if the New String is "FWD:", multiple forwarders may each add it, resulting in "FWD: FWD: FWD: . . . ". In such a case, it may be desired to approve multiple repetitions without creating a separate anticipated change for every combination. Repetition parameters may comprise, but not limited to the following:
      i. Repetition processing activation,
      ii. Maximum number of repetitions,
      iii. Minimum number of repetitions,
      iv. Separator string, and
      v. Section where to locate the repetition, and
   b. Custom macro. Wherein the custom macro may comprise a custom computing device 800 code compatible with the platform 100, capable of processing input data, such as anticipated change parameters, and generate output data such as additional anticipated change parameters,
   c. Save current anticipated change 2123:
      i. If the continuation indication is for creation:
      1. Add current anticipated change to the list of allowed anticipated changes 2123a, and
      ii. If the continuation indication is for modification:
   d. Prompt user for a continuation indication 2124, wherein the continuation indication may comprise prompting the user if they would like to create another anticipated change, modify existing anticipated change, delete existing anticipated change, or finish:
      i. If create another anticipated change, set continuation indication to creation,
      ii. If modify existing anticipated change, set continuation indication to modification,
      iii. If delete existing anticipated change, set continuation indication to modification, and
      iv. If finish, go to step 3;
3. Store the list of allowed anticipated changes on the current domain 2130 via, for example, a database, group policy, networked attached storage, and/or any other medium compatible with a computing device 800;
4. Prompting the user for indication for continuation 2140, wherein prompting the user comprises the following:
   a. Presenting the user with a UI where the user may indicate that they wish to continue, or they are finished, and
   b. Receiving the indication for continuation, wherein receiving the indication for continuation comprises restarting the method.

With reference to FIG. 2A, consistent with the present disclosure, Allowed Anticipated Change Generation Method 2100 may be provided. The method 2100 may enable the platform 100 to generate and/or modify a list of allowed anticipated changes and associated metadata. In some embodiments consistent with the present disclosure, the list of allowed anticipated changes may be generated and/or modified based on the inputs from at least one of, but not limited to: a user 110, an administrator 112, an AI module 190, and/or a system, such as an internal, external, and/or a third party system. In some embodiments, the aforementioned inputs may be obtained via the interface module 170, with the use of for example a UI and/or API. In some embodiments, a user 110, an administrator 112, an AI module 190, and/or a system may use the interface module 170 to delete at least one allowed anticipated change in the list of allowed anticipated changes. In some embodiments, the list of allowed anticipated changes may be automatically generated based on, at least in part, for example, past behavior, at least one sending user 110, an external on external and/or internal database, and/or predictions, such as predictions by an AI. In some embodiments, some steps may be repeated until a desired result is reached. In some embodiments, some steps may be skipped if a desired result is reached. In some embodiments, the list of allowed anticipated changes may be saved to a datastore, such as, but not limited to a datastore provided by a domain module 160. In some embodiments, more than one list of allowed anticipated changes may exist for at least one domain. In some embodiments, at least one list of allowed anticipated changes may apply to a plurality of domains, such as a domain forest.

Figure 2B:
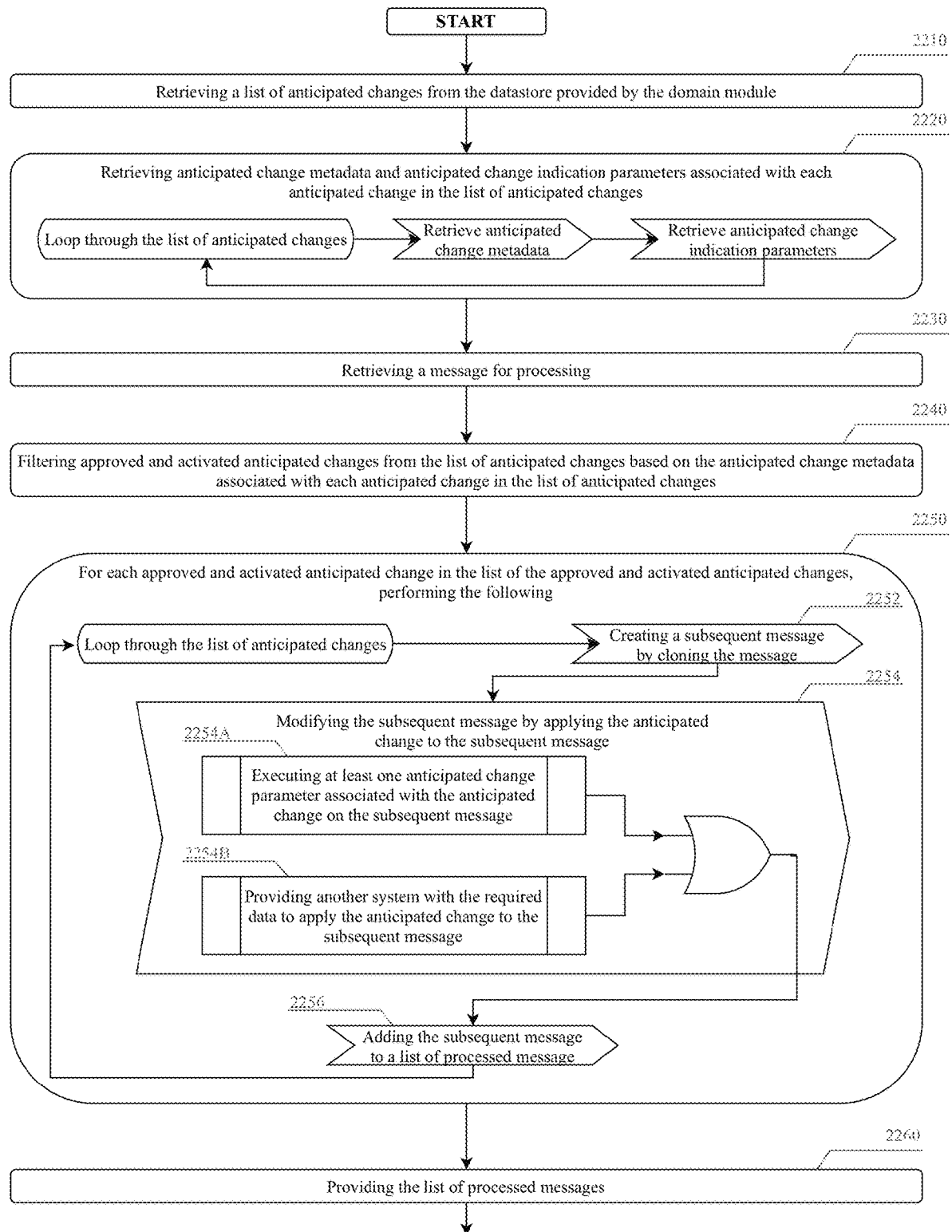
FIG. 2B is a flow chart of a method for providing Allowed Anticipated Change Processing Method 2200.

2200 Allowed Anticipated Change Processing Method (Illustrated in FIG. 2B)

Consistent with embodiments of the present disclosure, a method may be performed by at least one of the aforementioned modules. The method may be embodied as, for example, but not limited to, computer instructions, which when executed, perform the method. The method may comprise the following stages:
1. Retrieving a list of anticipated changes from the datastore provided by the domain module 2210;
2. Retrieving anticipated change metadata and anticipated change indication parameters associated with each anticipated change in the list of anticipated changes 2220:
   a. Wherein retrieving anticipated change metadata may be for administrative purposes, comprising fields such as, but not limited to at least one of the following:
      i. Name of the change,
      ii. Creation date/time,
      iii. Modification date/time,
      iv. Activation status of the change, and
      v. Approval status of the change, and b. Wherein retrieving anticipated change parameters may define the allowed change at least one computing system 800, comprising fields such as, but not limited to at least one of the following:
   i. Section where the change may reside, such as body or subject,
   ii. Change type, such as addition, removal, or modification,
   iii. Old string (to remove/modify),
   iv. New string (what can be added or be a result of a modification),
   v. Location of the change, such as, but not limited to a location at the end of the subject section or after every comma, and
   vi. Set of modifier parameters, such as, but not limited to the following:
      1. Repetition parameters, wherein repetition parameters may affect if an approved change is repeated. As a non-limiting example, if the New String is "FWD:", multiple forwarders may each add it, resulting in "FWD: FWD: FWD: . . .". In such a case, it may be desired to approve multiple repetitions without creating a separate anticipated change for every combination. Repetition parameters may comprise, but not limited to the following:
         a. Repetition processing activation,
         b. Maximum number of repetitions,
         c. Minimum number of repetitions,
         d. Separator string, and
         e. Section where to locate the repetition, and
      2. Custom macro. Wherein the custom macro may comprise a custom computing device 800 code compatible with the platform 100, capable of processing input data, such as anticipated change parameters, and generate output data such as additional anticipated change parameters,
3. Retrieving a message for processing 2230 from, for example, the MSA:
   a. In some embodiments consistent with the present disclosure, the message may be retrieved from another source, such as, but not limited to an MUA;
4. Filtering approved and activated anticipated changes from the list of anticipated changes based on the anticipated change metadata associated with each anticipated change in the list of anticipated changes 2240,
5. For each approved and activated anticipated change in the list of the approved and activated anticipated changes, performing the following 2250:
   a. Creating a subsequent message by cloning the message 2252,
   b. Modifying the subsequent message by applying the anticipated change to the subsequent message 2254,
      i. Wherein applying the anticipated change to the subsequent message may comprise at least one of the following:
         1. Executing at least one anticipated change parameter associated with the anticipated change on the subsequent message 2254A,
         2. Providing another system with the required data to apply the anticipated change to the subsequent message 2254B,
         a. wherein providing another system with the required data to apply the anticipated change to the subsequent message may comprise at least one of the following:
            i. Providing an AI system with the required data to apply the anticipated change to the subsequent message,
            ii. Providing raw data, such as, but not limited to the subsequent message and anticipated change parameters associated with the anticipated change, and
            iii. Providing instructions compatible and the subsequent message to another system by generating the instructions based on the anticipated change parameters, and
         b. wherein providing another system with the required data to apply the anticipated change to the subsequent message may comprise providing the required data to, for example, at least one of the following:
            i. AI system,
            ii. A data processing algorithm,
            iii. Cloud platform,
            iv. At least one human, and
            v. A third party data processor, and
   c. Adding the subsequent message to a list of processed messages 2256; and
6. Providing the list of processed messages 2260 to, for example, the MSA:
   a. In some embodiments consistent with the present disclosure, the list of processed messages may be provided to another source, such as, but not limited to the following:
      i. A provider of the message for processing,
      ii. The MUA,
      iii. The domain,
      iv. A third party and/or client, and
      v. The AI Module for, for example, training purposes.

Now with reference to FIG. 2B, consistent with the present disclosure, Allowed Anticipated Change Processing Method 2200 may be provided. The method 2200 may enable the platform 100 to process at least one list of allowed anticipated changed, via, for example, a processing module 180. In some embodiments consistent with the present disclosure, the at least one list may be obtained from at least one source, such as, but not limited to a datastore, such as a datastore provided by the domain module 160, external source, such as a third party source, and/or at least one list generated at run time by an AI module 190. In some embodiments, a message from processing may be retrieved from, for example, an MUA 120 and/or MSA 130. In some embodiments, the retrieval of the message may trigger the method 220. In other embodiments, the method may be triggered by other means, such as the platform 100. In some embodiments, the at least one list of allowed anticipated changes may be filtered to only the allowed anticipated changes applicable to the retrieved message and/or sending user 120, current domain and/or receiving user 115, and or other factors. In some embodiments, the filtering may be based on the metadata associated with each allowed anticipated change in the at least one list. In some embodiments, the filtering may be performed by at least one of processing module 180, AI module 190, and external system. In some embodiments, processing the least one list and/or filtered list may comprise generating a digital signature, such as DKIM signature, for each change in the at least one list and/or filtered list. In other embodiments, the processing may comprise generating a version of the message for each change.

Figure 3:
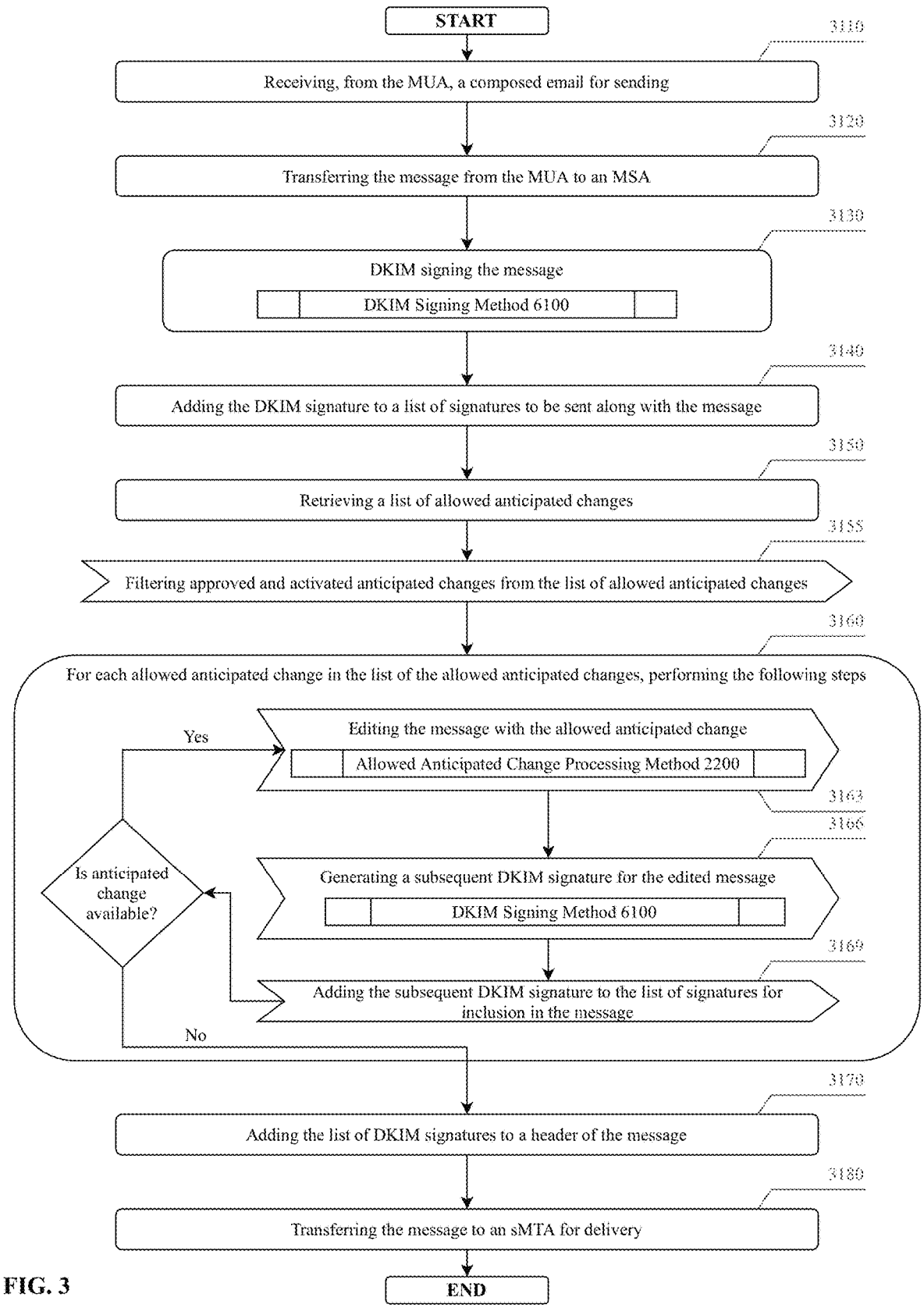
FIG. 3 is a flow chart of a method for providing Message Sending Method 3100.

3100 Message Sending Method (Illustrated by FIG. 3)

Consistent with embodiments of the present disclosure, a method may be performed by at least one of the aforementioned modules. The method may be embodied as, for example, but not limited to, computer instructions, which when executed, perform the method. The method may comprise the following stages:

1. Receiving, from an MUA, a composed message for sending 3110:
   a. Wherein the message may be composed by a user;
2. Transferring the message from the MUA to an MSA 3120,
3. DKIM signing the message 3130 via, for example, the MSA:
   a. Wherein DKIM signing comprises DKIM signing the message by performing the DKIM Signing Method 6100 in order to generate a DKIM signature;
4. Adding, via, for example, the MSA, the DKIM signature to a list of signatures to be sent along with the message 3140,
5. Retrieving, via, for example, the MSA, a list of allowed anticipated changes 3150, wherein retrieving comprises retrieving anticipated change metadata associated with each allowed anticipated change in the list of allowed anticipated changes:
   a. Filtering approved and activated anticipated changes from the list of anticipated changes 3155, based on, for example, the anticipated change metadata associated with each anticipated change in the list of anticipated changes;
6. For each allowed anticipated change in the list of the allowed anticipated changes, performing, via, for example, the MSA, the following steps 3160:
   a. Editing the message with the allowed anticipated change 3163 by, for example, performing Allowed Anticipated Change Processing Method 2200 provided by the processing module,
   b. Generating a subsequent DKIM signature for the edited message 3166 by, for example, performing the DKIM Signing Method 6100, and c. Adding the subsequent DKIM signature to the list of signatures for inclusion in the message 3169;
7. Adding, via, for example, the MSA, the list of DKIM signatures to a header of the message,
8. Transferring the message from, for example, the MSA to an sMTA for delivery.

Now with reference to FIG. 3, consistent with the present disclosure, Message Sending Method 3100 may be provided. The method 3100 may enable the platform 100 to securely send at least one message. In some embodiments consistent with the present disclosure, the method 3100 may allow for at least one allowed anticipated change to be made during transmission of the message, without compromising security or data integrity of the message. In some embodiments, the method 3100 may be performed by, for example, the MSA 130, another component of the platform 100, or an external system. In some embodiments, the method 3100 may comprise other methods, such as, but not limited to method 2200 and method 6100. In some embodiments, the method 3100 may perform at least one step in another method, such as method 2200 and method 6100. For example, method 3100 may perform the retrieving of at least one list of allowed anticipated changes and filter the retrieved at least one list, which may also be performed by method 6100. In some embodiments, the message may be secured with a digital signature, such as a DKIM signature. In some embodiments, more than one digital signature may be included. For example, the first digital signature may be for the original message, and each additional digital signature may correspond to the message being edited with an allowed anticipated change.

Figure 4:
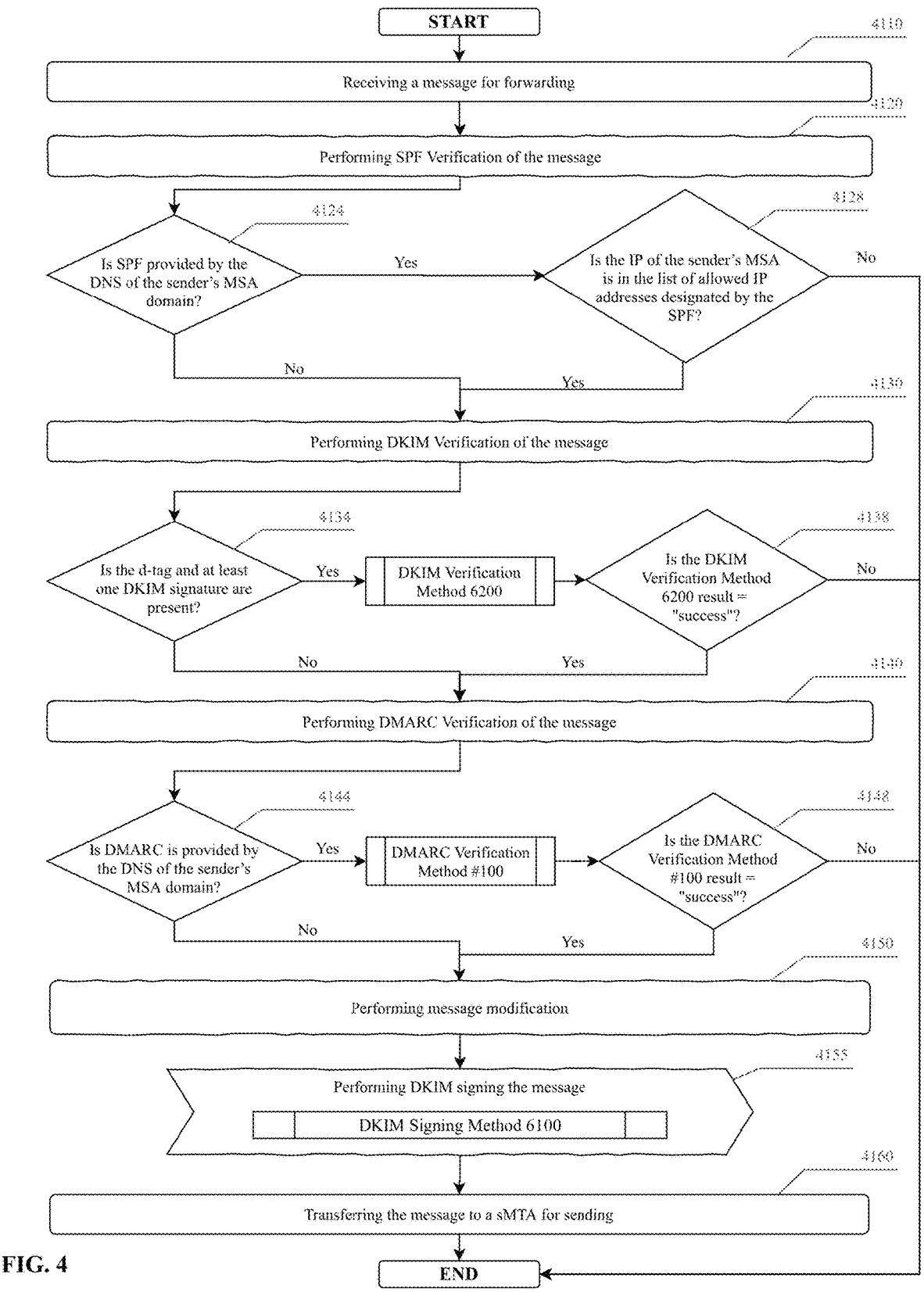
FIG. 4 is a flow chart of a method for providing Message Forwarding Method 4100.

4100 Message Forwarding Method (illustrated by FIG. 4)

Consistent with embodiments of the present disclosure, a method may be performed by at least one of the aforementioned modules. The method may be embodied as, for example, but not limited to, computer instructions, which when executed, perform the method. The method may comprise the following stages:

1. Receiving a message for forwarding 4110 from, for example, an rMTA;
2. Performing SPF Verification of the message, 4120 comprising the following:
   a. Checking if SPF is provided by the DNS of the sender's MSA domain 4124, and performing the following:
      i. If SPF is provided by the DNS of the sender's MSA domain:
         1. Verifying the IP of the sender's MSA is in the list of allowed IP addresses designated by the SPF, and only continue if verification succeeds 4128,
      ii. If SPF is not provided by the DNS of the sender's MSA domain:
         1. Continue to next step;
3. Performing DKIM Verification of the message 4130 comprising the following:
   a. Checking if the d-tag and at least one DKIM signature are present 4134, and performing the following:
      i. If the d-tag and at least one DKIM signature are present:
         1. Performing DKIM verification using, for example, the DKIM Verification Method 6200 and only continue if verification succeeds 4138,
      ii. If the d-tag and at least one DKIM signature are not present:
         1. Continue to next step;
4. Performing DMARC verification of the message 4140 comprising the following:
   a. Checking if the DMARC is provided by the DNS of the sender's MSA domain 4144, and performing the following:
      i. If DMARC is provided by the DNS of the sender's MSA domain:
         1. Performing DMARC verification using, for example, the DMARC Verification Method 7100 and only continue if verification succeeds 4148,
      ii. If DMARC is not provided by the DNS of the sender's MSA domain:
         1. Continue to next step;
5. Performing message modification 4150:
   a. DKIM signing the message 4155 via, for example, a local MSA, wherein DKIM signing comprises the following:
      i. DKIM-signing the message via DKIM Signing Method 6100, using the forwarding domain, in order to generate a DKIM signature, and
      ii. Adding a new DKIM signature with a d-tag containing the domain of the forwarder's MSA to the header of the message;
6. Transferring the message to an sMTA for sending 4160.

Now with reference to FIG. 4, consistent with the present disclosure, Message Forwarding Method 4100 may be provided. The method 4100 discloses an exemplary process that may be performed to a third party while forwarding and/or transferring the message. In some embodiments, the method 4100 may not be performed by the platform 100. In some embodiments, at least one step of the method may not be performed. As a non-limiting example, a third party email forwarder may not perform SPF verification step 4120, DKIM verification step 4130, DMARC verification step 4140, message modification step 4150, and/or DKIM signing step 4155. In some embodiments, the steps performed by the forwarding and/or transferring party may not affect the authenticity of the message, as long as any modification made to the original message was in an allowed anticipated change, and the associated DKIM signature is attached to the original message.

Figure 5:
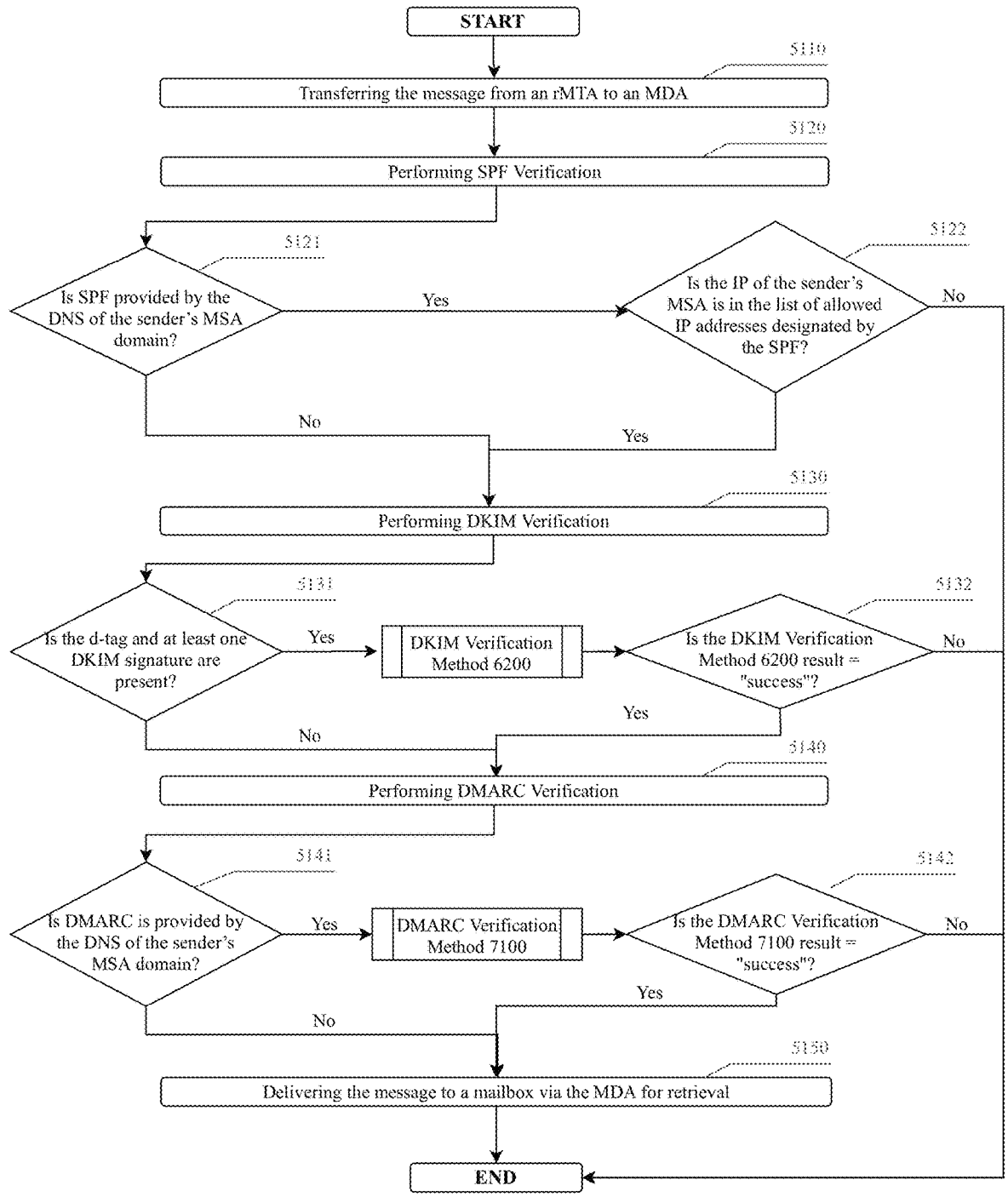
FIG. 5 is a flow chart of a method for providing Message Receiving Method 5100.

5100 Message Receiving Method (illustrated by FIG. 5)

Consistent with embodiments of the present disclosure, a method may be performed by at least one of the aforementioned modules. The method may be embodied as, for example, but not limited to, computer instructions, which when executed, perform the method. The method may comprise the following stages:

1. Transferring the message from an rMTA to an MDA 5110;
2. In some embodiments consistent with the present disclosure, the performing at least one of the following checks, by the MDA, before delivering the message to a mailbox:
   a. Performing SPF verification 5120 comprising the following:
      i. Checking If SPF is provided by the DNS of a sender's MSA domain 5121:
         1. If SPF is provided by the DNS of a sender's MSA domain:
            a. Verifying, via the MDA, an IP of a sender's MSA is in a list of allowed IP addresses designated by the SPF, and only continue if verification succeeds 5122,
   b. Performing DKIM verification 5130 comprising the following:
      i. Checking if at least one DKIM signature is present 5131 and performing the following:
         1. If at least one DKIM signature is present:
            a. Verifying, via the MDA, the at least one DKIM signature using, for example, the DKIM Verification Method 6200, and only continue if verification succeeds 5132, and
   c. Performing DMARC verification 5140 comprising the following:
      i. Checking if DMARC is provided by the DNS of the sender's MSA domain 5141 and performing the following:
         1. If DMARC is provided by the DNS of the sender's MSA domain:
            a. Verifying, via the MDA, DMARC using the DMARC Verification Method 7100, and only continue if verification succeeds, otherwise the MDA may follow DMARC policy for failed verification, and may only proceed to step 3 if the DMARC policy allows it 5142;
3. Delivering the message to a mailbox via the MDA for retrieval 5150 by, for example, an MUA.

Now with reference to FIG. 5, consistent with the present disclosure, Message Receiving Method 5100 may be provided. The method 5100 may enable the platform 100 to receive messages sent by the sending user 110. In some embodiments consistent with the present disclosure, the method 5100 may be performed by a third party and/or outside of the platform 100. In some embodiments, some steps may be skipped, such as, but not limited to SPF verification (step 5120) and/or DKIM verification (step 5130) and/or DMARC verification (step 5140). In other embodiments, all of the steps may be performed to authenticate the message and/or verify the data integrity of the message. In some embodiments, the method 5100 may comprise other methods, such as, but not limited to method 2200 and method 6100. In some embodiments, multiple digital signatures, such as DKIM signatures, may be embedded in the message. In such embodiments, some steps, such as steps 5131 and/or 5132 may be repeated, until a successful signature match is found. In some cases no matching digital signatures may be embedded in the message, such as when a forwarder 145 alters a message in a way that was not anticipated and/or allowed by the platform 100, wherein the authentication may fail and/or the message may not be delivered. In some embodiments, the DMARC verification may fail even when DKIM verification passes, thereby failing message authentication and possibly failing to deliver the message. In some embodiments, an authentication report may be sent to the originating domain of the message. In some embodiments, optional steps may be performed (step 5120) comprising, but not limited to performing SPF verification (step 5121) and verifying that the sending domain is in the list of allowed sending domains and/or is not in the list of blacklisted domains. As a non-limiting example, upon receiving the message from an rMTA 144, a check may be performed that the sending domain is not a known spamming domain and sending address (5321.From and/or 5322.From) is not in a list of known spammers. If either of the aforementioned checks fail, the message may be discarded and/or the method may end. In some instances, a report may be sent to the sending domain.

Figure 6A:
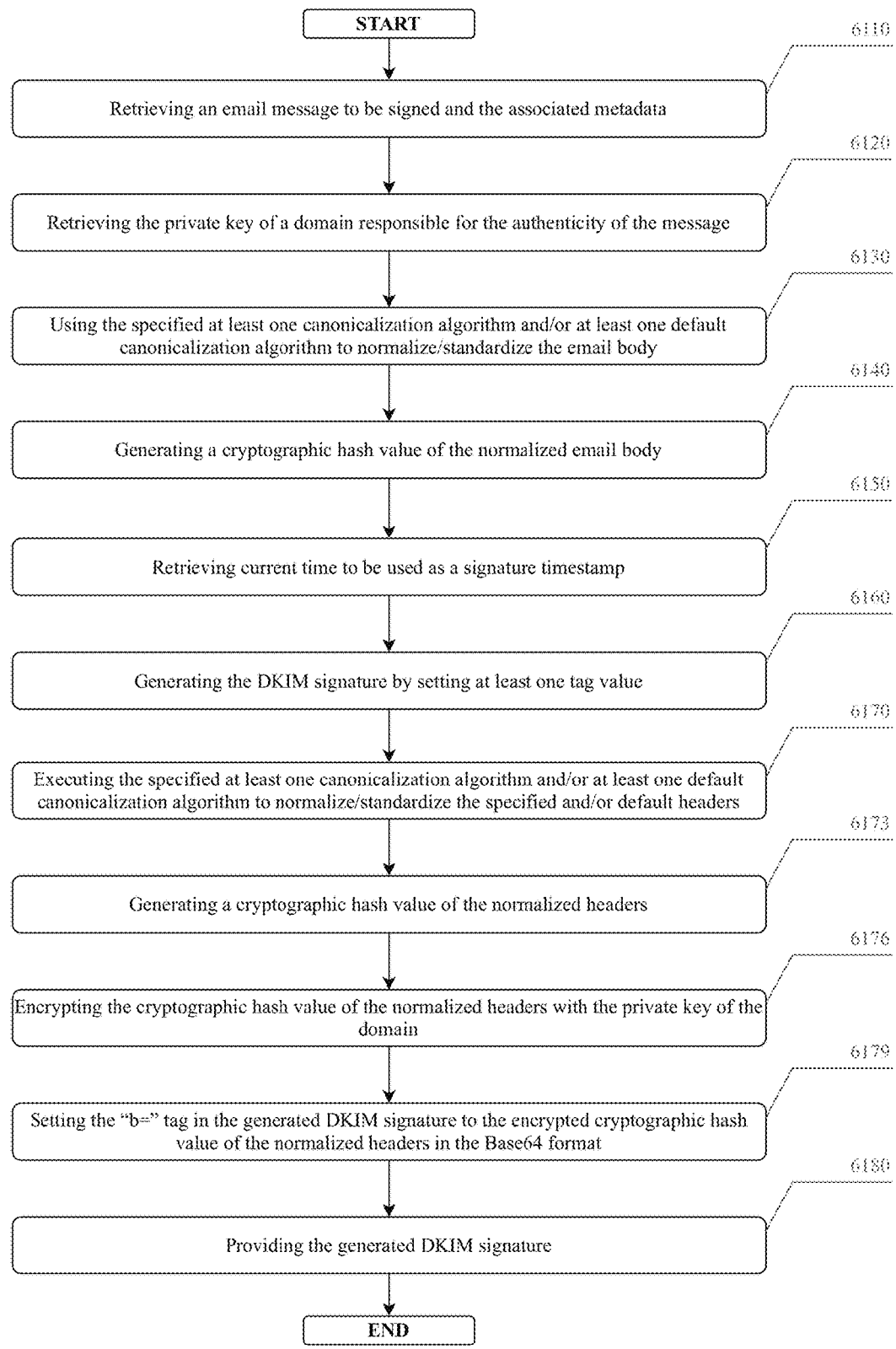
FIG. 6A is a flow chart of a method for providing DKIM Signing Method 6100.

6100 DKIM Signing Method (Illustrated by FIG. 6A)

Consistent with embodiments of the present disclosure, a method may be performed by at least one of the aforementioned modules. The method may be embodied as, for example, but not limited to, computer instructions, which when executed, perform the method. The method may comprise the following stages:

1. Retrieving a message to be signed along with associated metadata 6110, such as, but not limited to the following (some may be optional in certain embodiments):
   a. Headers to sign to be specified by the "h=" tag, such as, but not limited to from address, to address, and/or any other header,
   b. Domain name to be specified by the "d=" tag,
   c. Signing party and/or 5322.From Address, such as, but not limited to at least one of the following:
      i. The direct handler of the message, such as the author,
      ii. The submission site,
      iii. Further intermediary along the transit path, and
      iv. An indirect handler, such as an independent service that is providing assistance to a direct handler,
   d. Signing algorithm to use and specify by the "a=" tag,
   e. Selector to be specified by the "s=" tag,
   f. At least one canonicalization algorithm for header and body and to be specified by the "c=" tag,
   g. Default query method to be specified by the "q=" tag, and h. Expire time to be specified by the "x=" tag;
2. Retrieving a private key of a domain responsible for the authenticity of the message 6120;
3. Executing the specified at least one canonicalization algorithm and/or at least one default canonicalization algorithm to normalize/standardize the email body 6130;
4. Generating a first cryptographic hash value of the normalized email body 6140, such as, but not limited to, MD5 and/or SHA-256 hash value, via the retrieved signing algorithm and/or default signing algorithm;
5. Retrieving current time to be used as a signature timestamp 6150;
6. Generating the DKIM signature by setting at least one tag value 6160, such as, but not limited to the following (some may be optional in certain embodiments):
   a. Version of current DKIM system in the "v=" tag,
   b. Specified and/or default headers to sign in the "h=" tag,
   c. Domain name in the "d=" tag,
   d. Specified and/or default signing algorithm used in the "a=" tag,
   e. Selector in the "s=" tag,
   f. The at least one canonicalization algorithm used in the "c=" tag,
   g. Default query method in the "q=" tag,
   h. Specified expire time in the "x=" tag,
   i. Signature timestamp in the "t=" tag,
   j. The first cryptographic hash value of the normalized email body in Base64 format in the "bh=" tag, and
   k. Blank value in the "b=" tag;
7. Executing the specified at least one canonicalization algorithm and/or at least one default canonicalization algorithm to normalize/standardize the specified and/or default headers 6170;
8. Generating a second cryptographic hash value of the normalized headers 6173, such as, but not limited to, MD5 and/or SHA-256 hash value, using the retrieved and/or default signing algorithm with the following restrictions:
   a. 5322.From and the generated DKIM signature headers may be required, even if not specified, and
   b. Other headers may be optional, some of which may be considered best practice in the industry by a person having ordinary skill in the art;
9. Encrypting the second cryptographic hash with the private key of a current domain 6176;
10. Setting the "b=" tag in the generated DKIM signature to the encrypted second cryptographic hash value in the Base64 format 6179; and
11. Providing the generated DKIM signature 6180.

Now with reference to FIG. 6A, consistent with the present disclosure, DKIM Signing Method 6100 may be provided. The method 6100 may enable the platform 100 to digitally sign a message with at least one digital signature, such as DKIM signature. Furthermore, the method 6100 may enable sure transferring of the message, when the receiving platform may verify the authenticity and/or data integrity of the message by verifying the at least one digital signature embedded in the message. In some embodiments, the method 6100 may be performed multiple times, in order to generate multiple digital signatures. As a non-limiting example, the method 6100 may be performed once for the original message, and performed again for each allowed anticipated change. Therefore, if a message is altered during transmission in a way that is consistent with at least one allowed anticipated change, message authentication may still pass, thereby verifying the security, authenticity and data integrity of the message.

In some embodiments consistent with the present disclosure, the method 6100 may be performed by a platform other than the platform 100 disclosed herein. In some embodiments, steps may be skipped and/or additional steps may be added. In some embodiments, the method 6100 may be run multiple times to generate a digital signature for multiple domains. In some embodiments, at least one digital signature generated may correspond to the domain specified by 5321.From address and/or 5322.From address. In other embodiments, at least one digital signature generated may not correspond to the domain specified by 5321.From address and/or 5322.From address. In yet other embodiments, all signatures generated may correspond to the domain specified by 5321.From address and/or 5322.From address.

Figure 6B:
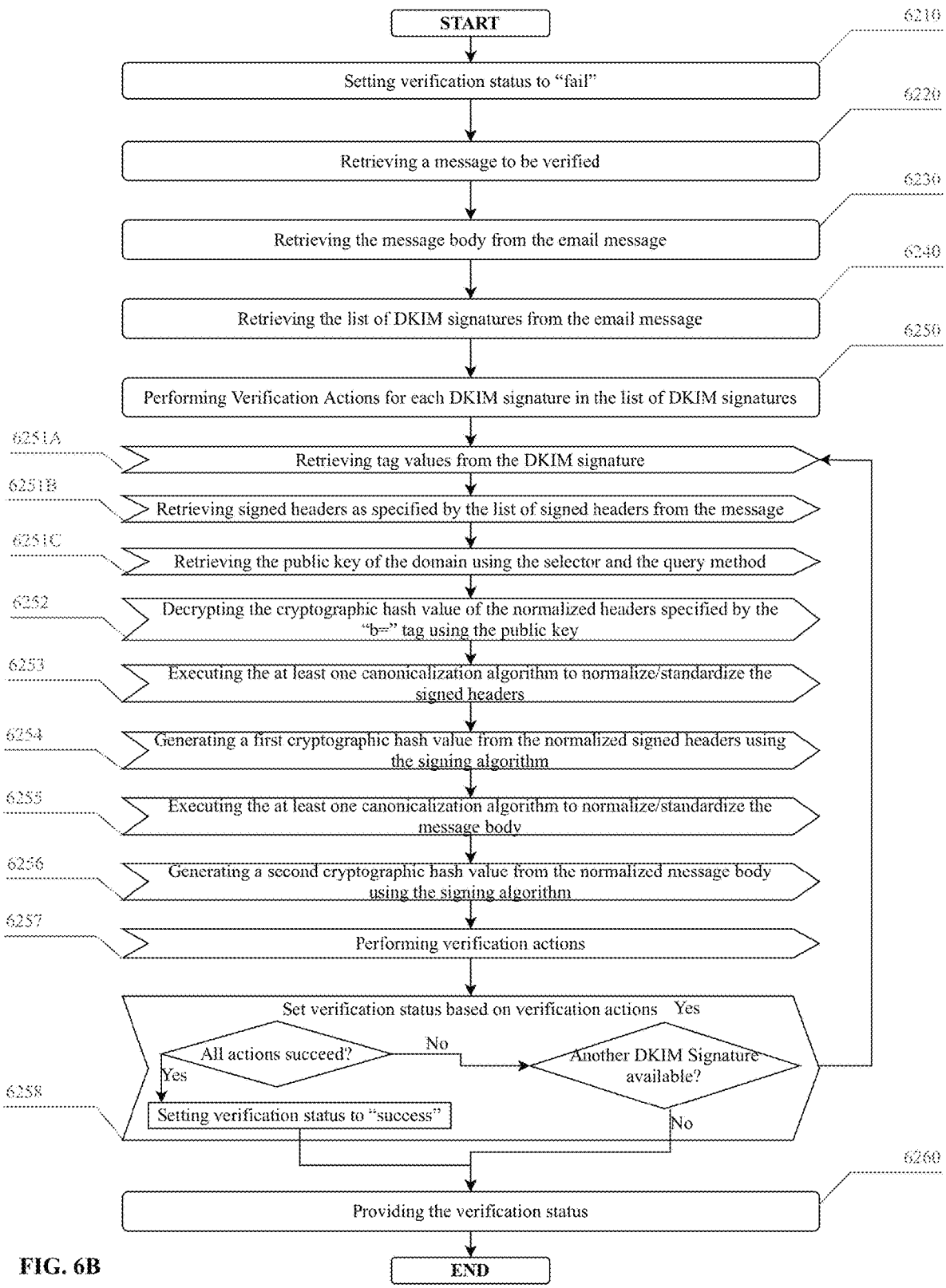
FIG. 6B is a flow chart of a method for providing DKIM Verification Method 6200.

6200 DKIM Verification Method (Illustrated by FIG. 6B)

Consistent with embodiments of the present disclosure, a method may be performed by at least one of the aforementioned modules. The method may be embodied as, for example, but not limited to, computer instructions, which when executed, perform the method. The method may comprise the following stages:
1. Setting a verification status to "fail" 6210;
2. Retrieving a message to be verified 6220;
3. Retrieving a message body from the message 6230;
4. Retrieving a list of DKIM signatures from the message 6240;
5. Performing verification actions for each DKIM signature in the list of DKIM signatures 6250, comprising at least the following:
   a. Retrieving tag values from the DKIM signature 6251, comprising, but not limited to the following:
      i. A domain specified by the d-tag,
      ii. Signing algorithm specified by the "a=" tag,
      iii. Query method specified by the "q=" tag,
      iv. List of signed headers specified by the "h=" tag,
      v. Selector specified by the "s=" tag,
      vi. At least one canonicalization algorithm specified by the "c=" tag,
      vii. Cryptographic hash value of the normalized email body specified by the "bh=" tag, and
      viii. Encrypted cryptographic hash value of the normalized headers specified by the "b=" tag,
   b. Retrieving signed headers as specified by the list of signed headers from the message 6251B,
   c. Retrieving a public key of the domain using the selector and a query method 6251C,
   d. Decrypting the cryptographic hash value of the normalized headers specified by the "b=" tag using the public key 6252,
   e. Executing the at least one canonicalization algorithm to normalize/standardize the signed headers 6253. In some embodiments consistent with the present disclosure, the at least one canonicalization algorithm may not be present, and a default canonicalization algorithm may be used instead,
   f. Generating a first cryptographic hash value from the normalized signed headers using the signing algorithm 6254,
   g. Executing the at least one canonicalization algorithm to normalize/standardize the message body 6255,
   h. Generating a second cryptographic hash value from the normalized message body using the signing algorithm 6256, i. Performing verification actions 6257 comprising of at least the following:
   i. Verifying that the second cryptographic hash value is equal to the cryptographic hash value of the normalized message body specified by the "bh=" tag, and
   ii. Verifying that the first cryptographic hash value is equal to the decrypted cryptographic hash value of the normalized headers, and
j. Setting the verification status based on the verification actions 6258, comprising at least the following:
   i. If all of the verification action succeed:
      1. Setting verification status to "success", and 2. Stopping all further processing, and advancing to step 6, and
   ii. If at least one verification action fails:
      1. Moving on to next DKIM signature and/or step 6 if no more signatures available; and
6. Providing the verification status 6260.

Now with reference to FIG. 6B, consistent with the present disclosure, DKIM Verification Method 6200 may be provided. The method 6200 may enable the platform 100 to verify at least one digital signature, such as DKIM signature, embedded in the message, thereby verifying authenticity and data integrity of the message. In some embodiments consistent with the present disclosure, the method 6200 may be performed by the platform 100. In other embodiments, the method 6200 may be performed by a platform other than the platform 100 disclosed herein. In some embodiments, some steps may be skipped and/or added to the method 6200. In some embodiments, certain steps may be performed outside of method 6200. As a non-limiting example, retrieving the message (step 6220) and retrieving the list of digital signatures from the message (step 6240) may be performed by the method 5100. In some embodiments, more than one digital signature may be embedded in the message, therefore step 6250 may be performed multiple times. In some embodiments, at least one digital signature embedded in the message may correspond to the domain specified by 5321.From address and/or 5322.From address. In other embodiments, at least one digital signature generated may not correspond to the domain specified by 5321.From address and/or 5322.From address. In yet other embodiments, all signatures generated may correspond to the domain specified by 5321.From address and/or 5322.From address.

Figure 7:
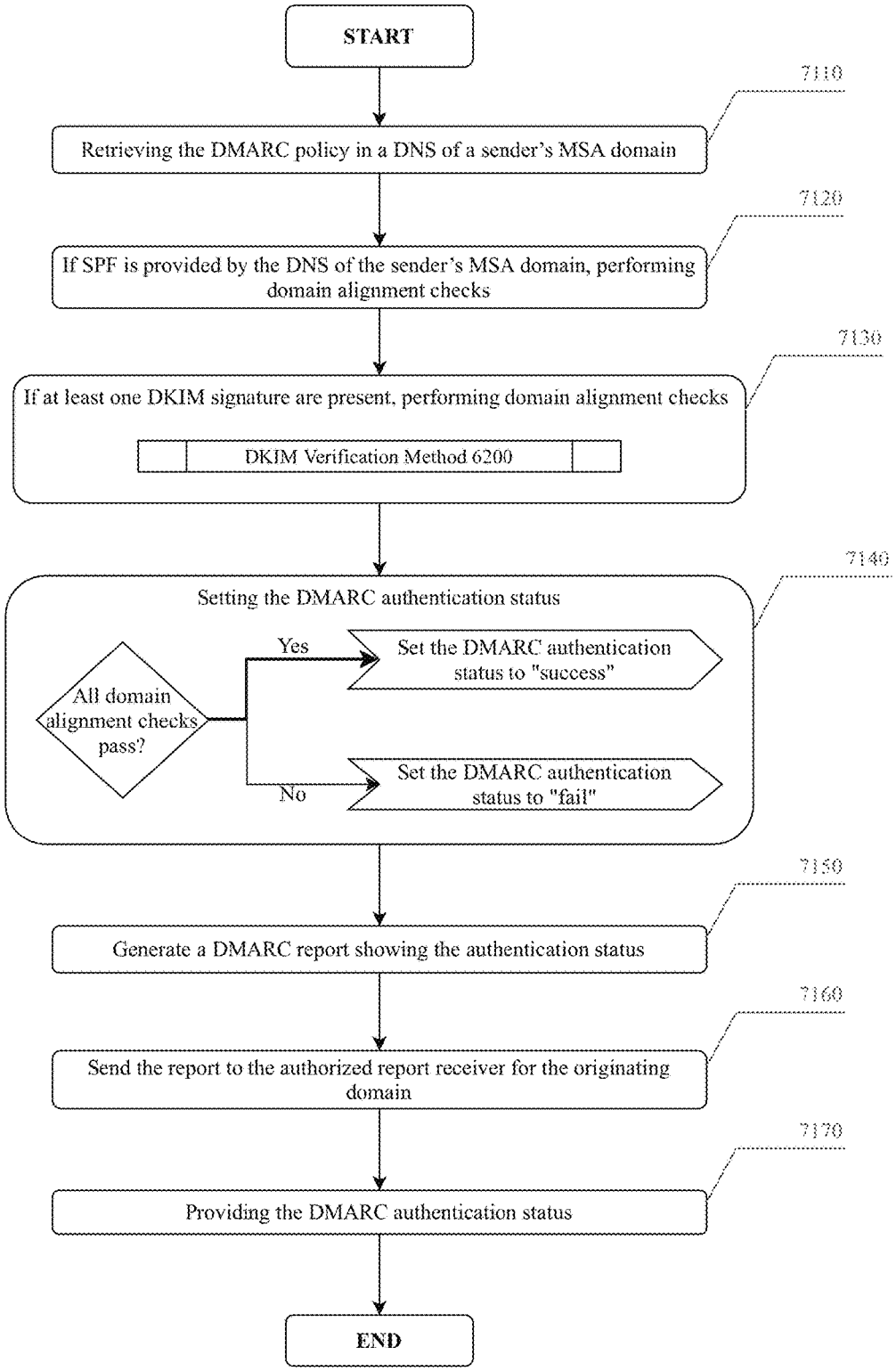
FIG. 7 is a flow chart of a method for providing DMARC Verification Method 7100.

7100 DMARC Verification Method (Illustrated by FIG. 7)

Consistent with embodiments of the present disclosure, a method may be performed by at least one of the aforementioned modules. The method may be embodied as, for example, but not limited to, computer instructions, which when executed, perform the method. The method may comprise the following stages:
1. Retrieving the DMARC policy in a DNS of a sender's MSA domain 7110;
2. If SPF is provided by the DNS of the sender's MSA domain, performing SPF domain alignment checks 7120 comprising at least the following:
   a. Verifying the IP of the sender's MSA is in a list of allowed IP addresses designated by the SPF, and
   b. Verifying the 5321.FROM Address matches the 5322.FROM Address;
3. If at least one DKIM signature is provided, performing DKIM domain alignment checks 7130 comprising at least the following:
   a. Verifying the at least one DKIM signature via the DKIM Verification Method 6200, and
   b. Verifying that a domain specified in the d-tag corresponding to the verified at least one DKIM signature matches a domain specified in the 5322.FROM Address;
4. Setting a DMARC authentication status 7140, wherein setting the DMARC authentication status comprises the following:
   a. if all of the aforementioned domain alignment checks pass:
      i. Setting the DMARC authentication status to success, and
   b. if at least one domain alignment check does not pass:
      i. Setting the DMARC authentication status to fail;
5. Generating a DMARC report based on the DMARC authentication status 7150:
   a. Wherein the report may comprise a color key for SPF and DKIM authentication results. For example, green may mean a check passes DMARC-aligned authentication while red may mean a check did not pass DMARC-aligned authentication;
6. Sending the report to an authorized report receiver for the originating domain 7160; and
7. Providing the DMARC authentication status 7170.

Now with reference to FIG. 7, consistent with the present disclosure, DMARC Verification Method 7100 may be provided. The method 7100 may enable the platform 100 to authenticate a message with, for example, a sender's domain, and make sure it complies with the sender's domain DMARC policy. Furthermore, the method 7100 may verify that 5321.From address passes the corresponding authentication checks and/or the 5321.From address aligns with the 5322.From address. Further still, the method 7100 may send at least one report to the sender's domain with, for example, DMARC verification status and/or DKIM verification status and/or SPF verification status. By performing DMARC verification via method 7100, authenticity of the message may be verified and/or messages with fabricated 5322.From addresses for, for example, deception of the receiving user 115 may be filtered.

Embodiments of the present disclosure provide a hardware and software platform operative as a distributed system of modules and computing elements.

IV. Computing Device Architecture

Platform 100 may be embodied as, for example, but not be limited to, a website, a web application, a desktop application, backend application, and a mobile application compatible with a computing device 800. The computing device 800 may comprise, but not be limited to the following:

Mobile computing device, such as, but is not limited to, a laptop, a tablet, a smartphone, a drone, a wearable, an embedded device, a handheld device, an Arduino, an industrial device, or a remotely operable recording device;

A supercomputer, an exa-scale supercomputer, a mainframe, or a quantum computer;

A minicomputer, wherein the minicomputer computing device comprises, but is not limited to, an IBM AS400/iSeries/System I, A DEC VAX/PDP, a HP3000, a Honeywell-Bull DPS, a Texas Instruments TI-990, or a Wang Laboratories VS Series; and A microcomputer, wherein the microcomputer computing device comprises, but is not limited to, a server, wherein a server may be rack mounted, a workstation, an industrial device, a raspberry pi, a desktop, or an embedded device.

Platform 100 may be hosted on a centralized server or a cloud computing service. Although methods disclosed herein have been described to be performed by a computing device 800, it should be understood that, in some embodiments, different operations may be performed by a plurality of the computing devices 800 in operative communication at least one network.

Embodiments of the present disclosure may comprise a system having a central processing unit (CPU) 820, a bus 830, a memory unit 840, a power supply unit (PSU) 850, and one or more Input/Output (I/O) units. The CPU 820 coupled to the memory unit 840 and the plurality of I/O units 860 via the bus 830, all of which are powered by the PSU 850. It should be understood that, in some embodiments, each disclosed unit may actually be a plurality of such units for the purposes of redundancy, high availability, and/or performance. The combination of the presently disclosed units is configured to perform the stages any method disclosed herein.

Figure 8:
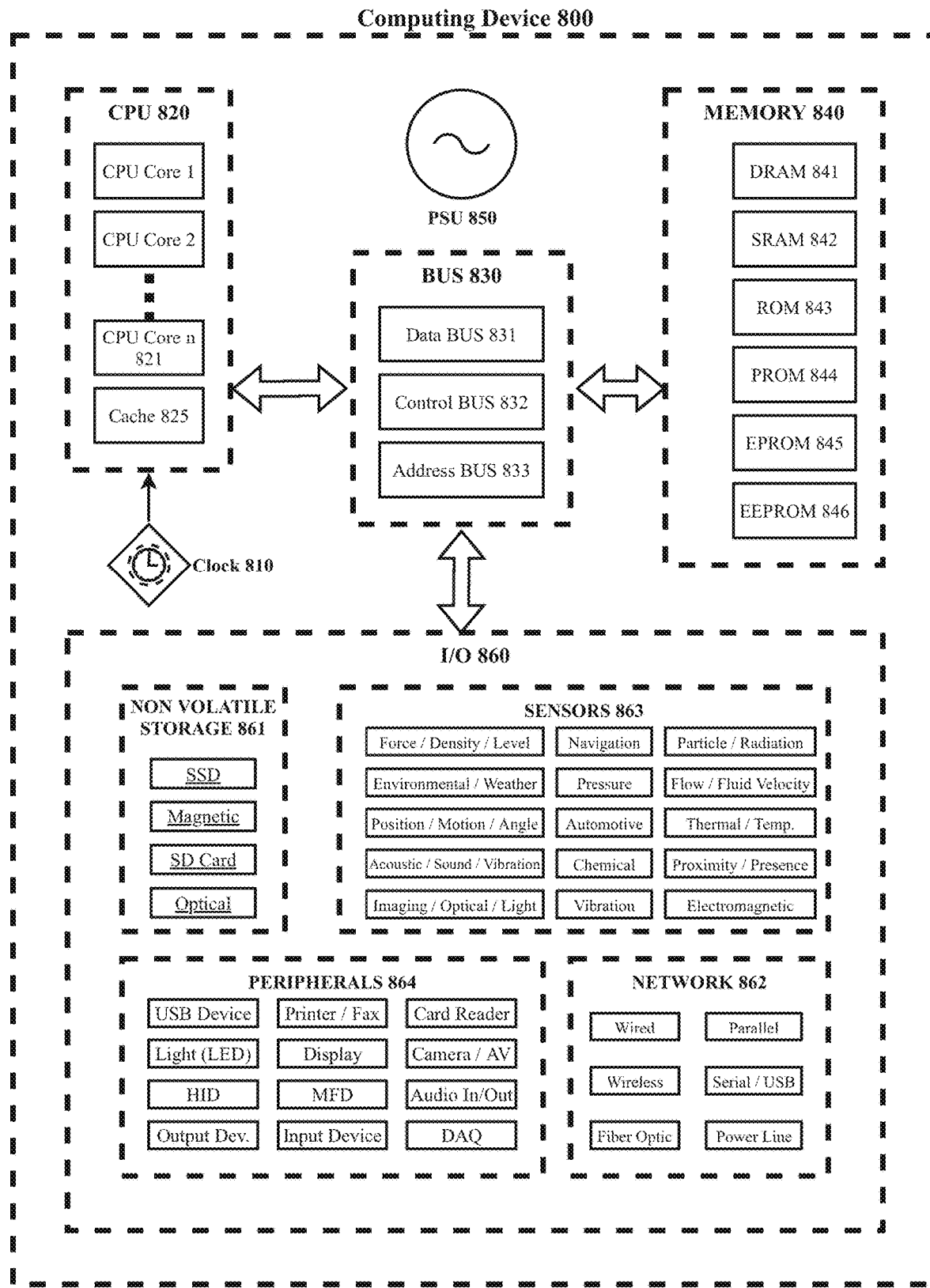
FIG. 8 is a block diagram of a system including a computing device for performing the methods of the present disclosure.

FIG. 8 is a block diagram of a system including computing device 800. Consistent with an embodiment of the disclosure, the aforementioned CPU 820, the bus 830, the memory unit 840, a PSU 850, and the plurality of I/O units 860 may be implemented in a computing device, such as computing device 800 of FIG. 8. Any suitable combination of hardware, software, or firmware may be used to implement the aforementioned units. For example, the CPU 820, the bus 830, and the memory unit 840 may be implemented with computing device 800 or any of other computing devices 800, in combination with computing device 800. The aforementioned system, device, and components are examples and other systems, devices, and components may comprise the aforementioned CPU 820, the bus 830, the memory unit 840, consistent with embodiments of the disclosure.

At least one computing device 800 may be embodied as any of the computing elements illustrated in all of the attached figures, including but not limited to the following:
Admin Console 113;
MUA 120;
MSA 130;
MTA 140 including sMTA 142, 148 and rMTA 144, 146;
MDA 150;
Domain Module 160;
Interface Module 170;
Processing Module 180;
AI Module 190;
Allowed Anticipated Change Generation Method 2100;
Allowed Anticipated Change Processing Method 2200;
Message Sending Method 3100;
Message Forwarding Method 4100;
Message Receiving Method 5100;
DKIM Signing Method 6100;
DKIM Verification Method 6200; and
DMARC Verification Method 7100.

A computing device 800 does not need to be electronic, nor even have a CPU 820, nor bus 830, nor memory unit 840. The definition of the computing device 800 to a person having ordinary skill in the art is "A device that computes, especially a programmable [usually] electronic machine that performs high-speed mathematical or logical operations or that assembles, stores, correlates, or otherwise processes information." Any device which processes information qualifies as a computing device 800, especially if the processing is purposeful.

With reference to FIG. 8, a system consistent with an embodiment of the disclosure may include a computing device, such as computing device 800. In a basic configuration, computing device 800 may include at least one clock module 810, at least one CPU 820, at least one bus 830, and at least one memory unit 840, at least one PSU 850, and at least one I/O 860 module, wherein I/O module may be comprised of, but not limited to a non-volatile storage sub-module 861, a communication sub-module 862, a sensors sub-module 863, and a peripherals sub-module 864.

A system consistent with an embodiment of the disclosure the computing device 800 may include the clock module 810 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 820, the central component of modern computers, which relies on a clock. The only exceptions are asynchronous circuits such as asynchronous CPUs. The clock 810 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 4 wires.

Many computing devices 800 use a "clock multiplier" which multiplies a lower frequency external clock to the appropriate clock rate of the CPU 820. This allows the CPU 820 to operate at a much higher frequency than the rest of the computer, which affords performance gains in situations where the CPU 820 does not need to wait on an external factor (like memory 840 or input/output 860). Some embodiments of the clock 810 may include dynamic frequency change, where the time between clock edges can vary widely from one edge to the next and back again.

A system consistent with an embodiment of the disclosure the computing device 800 may include the CPU unit 820 comprising at least one CPU Core 821. A plurality of CPU cores 821 may comprise identical the CPU cores 821, such as, but not limited to, homogeneous multi-core systems. It is also possible for the plurality of CPU cores 821 to comprise different the CPU cores 821, such as, but not limited to, heterogeneous multi-core systems, big.LITTLE systems and some AMD accelerated processing units (APU). The CPU unit 820 reads and executes program instructions which may be used across many application domains, for example, but not limited to, general purpose computing, embedded computing, network computing, digital signal processing (DSP), and graphics processing (GPU). The CPU unit 820 may run multiple instructions on separate CPU cores 821 at the same time. The CPU unit 820 may be integrated into at least one of a single integrated circuit die and multiple dies in a single chip package. The single integrated circuit die and multiple dies in a single chip package may contain a plurality of other aspects of the computing device 800, for example, but not limited to, the clock 810, the CPU 820, the bus 830, the memory 840, and I/O 860.

The CPU unit 820 may contain cache 822 such as, but not limited to, a level 1 cache, level 2 cache, level 3 cache or combination thereof. The aforementioned cache 822 may or may not be shared amongst a plurality of CPU cores 821. The cache 822 sharing comprises at least one of message passing and inter-core communication methods may be used for the at least one CPU Core 821 to communicate with the cache 822. The inter-core communication methods may comprise, but not limited to, bus, ring, two-dimensional mesh, and crossbar. The aforementioned CPU unit 820 may employ symmetric multiprocessing (SMP) design.

The plurality of the aforementioned CPU cores 821 may comprise soft microprocessor cores on a single field programmable gate array (FPGA), such as semiconductor intellectual property cores (IP Core). The plurality of CPU cores 821 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 821, for example, but not limited to Instruction-level parallelism (ILP) such as, but not limited to, super-scalar pipelining, and Thread-level parallelism (TLP).

Consistent with the embodiments of the present disclosure, the aforementioned computing device 800 may employ a communication system that transfers data between components inside the aforementioned computing device 800, and/or the plurality of computing devices 800. The aforementioned communication system will be known to a person having ordinary skill in the art as a bus 830. The bus 830 may embody internal and/or external plurality of hardware and software components, for example, but not limited to a wire, optical fiber, communication protocols, and any physical arrangement that provides the same logical function as a parallel electrical bus. The bus 830 may comprise at least one of, but not limited to a parallel bus, wherein the parallel bus carry data words in parallel on multiple wires, and a serial bus, wherein the serial bus carry data in bit-serial form. The bus 830 may embody a plurality of topologies, for example, but not limited to, a multidrop/electrical parallel topology, a daisy chain topology, and a connected by switched hubs, such as USB bus. The bus 830 may comprise a plurality of embodiments, for example, but not limited to the following:

Internal data bus (data bus) 831/Memory bus
Control bus 832
Address bus 833
System Management Bus (SMBus)
Front-Side-Bus (FSB)
External Bus Interface (EBI)
Local bus
Expansion bus
Lightning bus
Controller Area Network (CAN bus)
Camera Link
ExpressCard
Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.
Small Computer System Interface (SCSI)/Serial Attached SCSI (SAS)
HyperTransport
InfiniBand
RapidIO
Mobile Industry Processor Interface (MIPI)
Coherent Processor Interface (CAPI)
Plug-n-play
1-Wire
Peripheral Component Interconnect (PCI), including embodiments such as, but not limited to, Accelerated Graphics Port (AGP), Peripheral Component Interconnect eXtended (PCI-X), Peripheral Component Interconnect Express (PCI-e) (i.e., PCI Express Mini Card, PCI Express M.2 [Mini PCIe v2], PCI Express External Cabling [ePCIe], and PCI Express OCuLink [Optical Copper{Cu} Link]), Express Card, AdvancedTCA, AMC, Universal IO, Thunderbolt/Mini DisplayPort, Mobile PCIe (M-PCIe), U.2, and Non-Volatile Memory Express (NVMe)/Non-Volatile Memory Host Controller Interface Specification (NVMHCIS).
Industry Standard Architecture (ISA), including embodiments such as, but not limited to Extended ISA (EISA), PC/XT-bus/PC/AT-bus/PC/104 bus (e.g. PC/104-Plus, PCI/104-Express, PCI/104, and PCI-104), and Low Pin Count (LPC).
Music Instrument Digital Interface (MIDI)
Universal Serial Bus (USB), including embodiments such as, but not limited to, Media Transfer Protocol (MTP)/Mobile High-Definition Link (MHL), Device Firmware Upgrade (DFU), wireless USB, InterChip USB, IEEE 1394 Interface/Firewire, Thunderbolt, and eXtensible Host Controller Interface (xHCI).

Consistent with the embodiments of the present disclosure, the aforementioned computing device 800 may employ hardware integrated circuits that store information for immediate use in the computing device 800, know to the person having ordinary skill in the art as primary storage or memory 840. The memory 840 operates at high speed, distinguishing it from the non-volatile storage sub-module 861, which may be referred to as secondary or tertiary storage, which provides slow-to-access information but offers higher capacities at lower cost. The contents contained in memory 840, may be transferred to secondary storage via techniques such as, but not limited to, virtual memory and swap. The memory 840 may be associated with addressable semiconductor memory, such as integrated circuits consisting of silicon-based transistors, used for example as primary storage but also other purposes in the computing device 800. The memory 840 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

Volatile memory which requires power to maintain stored information, for example, but not limited to, Dynamic Random-Access Memory (DRAM) 841, Static Random-Access Memory (SRAM) 842, CPU Cache memory 825, Advanced Random-Access Memory (A-RAM), and other types of primary storage such as Random-Access Memory (RAM).
Non-volatile memory which can retain stored information even after power is removed, for example, but not limited to, Read-Only Memory (ROM) 843, Programmable ROM (PROM) 844, Erasable PROM (EPROM) 845, Electrically Erasable PROM (EEPROM) 846 (e.g. flash memory and Electrically Alterable PROM

[EAPROM]), Mask ROM (MROM), One Time Programmable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.

Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with the embodiments of the present disclosure, the aforementioned computing device 800 may employ the communication system between an information processing system, such as the computing device 800, and the outside world, for example, but not limited to, human, environment, and another computing device 800. The aforementioned communication system will be known to a person having ordinary skill in the art as I/O 860. The I/O module 860 regulates a plurality of inputs and outputs with regard to the computing device 800, wherein the inputs are a plurality of signals and data received by the computing device 800, and the outputs are the plurality of signals and data sent from the computing device 800. The I/O module 860 interfaces a plurality of hardware, such as, but not limited to, non-volatile storage 861, communication devices 862, sensors 863, and peripherals 864. The plurality of hardware is used by the at least one of, but not limited to, human, environment, and another computing device 800 to communicate with the present computing device 800. The I/O module 860 may comprise a plurality of forms, for example, but not limited to channel I/O, port mapped I/O, asynchronous I/O, and Direct Memory Access (DMA).

Consistent with the embodiments of the present disclosure, the aforementioned computing device 800 may employ the non-volatile storage sub-module 861, which may be referred to by a person having ordinary skill in the art as one of secondary storage, external memory, tertiary storage, off-line storage, and auxiliary storage. The non-volatile storage sub-module 861 may not be accessed directly by the CPU 820 without using intermediate area in the memory 840. The non-volatile storage sub-module 861 does not lose data when power is removed and may be two orders of magnitude less costly than storage used in the memory module 840, at the expense of speed and latency. The non-volatile storage sub-module 861 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (861) may comprise a plurality of embodiments, such as, but not limited to:

Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD±RW/DVD+R DL/DVD-RAM/HD-DVD), Blu-ray Disk (BD) (BD-ROM/BD-R/BD-RE/BD-R DL/BD-RE DL), and Ultra-Density Optical (UD0).

Semiconductor storage, for example, but not limited to, flash memory, such as, but not limited to, USB flash drive, Memory card, Subscriber Identity Module (SIM) card, Secure Digital (SD) card, Smart Card, CompactFlash (CF) card, Solid-State Drive (SSD) and memristor.

Magnetic storage such as, but not limited to, Hard Disk Drive (HDD), tape drive, carousel memory, and Card Random-Access Memory (CRAM).

Phase-change memory

Holographic data storage such as Holographic Versatile Disk (HVD)

Molecular Memory

Deoxyribonucleic Acid (DNA) digital data storage

Consistent with the embodiments of the present disclosure, the aforementioned computing device 800 may employ the communication sub-module 862 as a subset of the I/O 860, which may be referred to by a person having ordinary skill in the art as at least one of, but not limited to, computer network, data network, and network. The network allows computing devices 800 to exchange data using connections, which may be known to a person having ordinary skill in the art as data links, between network nodes. The nodes comprise network computer devices 800 that originate, route, and terminate data. The nodes are identified by network addresses and can include a plurality of hosts consistent with the embodiments of a computing device 800. The aforementioned embodiments include, but not limited to personal computers, phones, servers, drones, and networking devices such as, but not limited to, hubs, switches, routers, modems, and firewalls.

Two nodes can be said are networked together, when one computing device 800 is able to exchange information with the other computing device 800, whether or not they have a direct connection with each other. The communication sub-module 862 supports a plurality of applications and services, such as, but not limited to World Wide Web (WWW), digital video and audio, shared use of application and storage computing devices 800, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g. TCP/IP, UDP, Internet Protocol version 4 [IPv4], and Internet Protocol version 6 [IPv6]), Synchronous Optical Networking (SONET)/Synchronous Digital Hierarchy (SDH), Asynchronous Transfer Mode (ATM), and cellular standards (e.g. Global System for Mobile Communications [GSM], General Packet Radio Service [GPRS], Code-Division Multiple Access [CDMA], and Integrated Digital Enhanced Network [IDEN]).

The communication sub-module 862 may comprise a plurality of size, topology, traffic control mechanism and organizational intent. The communication sub-module 862 may comprise a plurality of embodiments, such as, but not limited to:

Wired communications, such as, but not limited to, coaxial cable, phone lines, twisted pair cables (ethernet), and InfiniBand.

Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Wherein cellular systems embody technologies such as, but not limited to, 3G,4G (such as WiMax and LTE), and 5G (short and long wavelength).

Parallel communications, such as, but not limited to, LPT ports.

Serial communications, such as, but not limited to, RS-232 and USB.

Fiber Optic communications, such as, but not limited to, Single-mode optical fiber (SMF) and Multi-mode optical fiber (MMF).

Power Line Communications

The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 800 may employ the sensors sub-module 863 as a subset of the I/O 860. The sensors sub-module 863 comprises at least one of the devices, modules, and subsystems whose purpose is to detect events or changes in its environment and send the information to the computing device 800. Sensors are sensitive to the measured property, are not sensitive to any property not measured, but may be encountered in its application, and do not significantly influence the measured property. The sensors sub-module 863 may comprise a plurality of digital devices and analog devices, wherein if an analog device is used, an Analog to Digital (A-to-D) converter must be employed to interface the said device with the computing device 800. The sensors may be subject to a plurality of deviations that limit sensor accuracy. The sensors sub-module 863 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

Chemical sensors, such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nanosensors).

Automotive sensors, such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (o2), parking sensor, radar sensor, torque sensor, variable reluctance sensor, and water-in-fuel sensor.

Acoustic, sound and vibration sensors, such as, but not limited to, microphone, lace sensor (guitar pickup), seismometer, sound locator, geophone, and hydrophone.

Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.

Environmental, weather, moisture, and humidity sensors, such as, but not limited to, actinometer, air pollution sensor, bedwetting alarm, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.

Flow and fluid velocity sensors, such as, but not limited to, air flow meter, anemometer, flow sensor, gas meter, mass flow sensor, and water meter.

Ionizing radiation and particle sensors, such as, but not limited to, cloud chamber, Geiger counter, Geiger-Muller tube, ionization chamber, neutron detection, proportional counter, scintillation counter, semiconductor detector, and thermoluminescent dosimeter.

Navigation sensors, such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photoswitch, phototube, scintillometer, Shack-Hartmann, single-photon avalanche diode, superconducting nanowire single-photon detector, transition edge sensor, visible light photon counter, and wavefront sensor.

Imaging, optical and light sensors, such as, but not limited to, CMOS sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photoswitch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezo capacitive pressure sensor, piezoelectric sensor, torque sensor, and viscometer.

Thermal and temperature sensors, such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 800 may employ the peripherals sub-module 862 as a subset of the I/O 860. The peripheral sub-module 864 comprises ancillary devices uses to put information into and get information out of the computing device 800. There are 3 categories of devices comprising the peripheral sub-module 864, which exist based on their relationship with the computing device 800, input devices, output devices, and input/output devices. Input devices send at least one of data and instructions to the computing device 800. Input devices can be categorized based on, but not limited to:

Modality of input, such as, but not limited to, mechanical motion, audio, visual, and tactile.

Whether the input is discrete, such as but not limited to, pressing a key, or continuous such as but not limited to position of a mouse.

The number of degrees of freedom involved, such as, but not limited to, two-dimensional mice vs three-dimensional mice used for Computer-Aided Design (CAD) applications.

Output devices may provide output from the computing device 800. Output devices convert electronically generated information into a form that can be presented to humans. Input/output devices may perform both input and output functions. It should be understood by a person having ordinary skill in the art that the ensuing are non-limiting embodiments of the aforementioned peripheral sub-module 864:

Input Devices:
Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, that require up to six degrees of freedom such as, but not limited to, camera gimbals, Cave Automatic Virtual Environment (CAVE), and virtual reality systems.

Video Input devices may be used to digitize images or video from the outside world into the computing device 800. The information can be stored in a multitude of formats depending on the user's requirement. Examples of types of video input devices include, but not limited to, digital camera, digital camcorder, portable media player, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices may be used to capture sound. In some cases, an audio output device can be used as an input device, in order to capture produced sound. Audio input devices allow a user to send audio signals to the computing device 800 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to microphone, Musical Instrumental Digital Interface (MIDI) devices such as, but not limited to a keyboard, and headset.

Data AcQuisition (DAQ) devices may covert at least one of analog signals and physical parameters to digital values for processing by the computing device 800. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:
Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).

Printers, such as, but not limited to, inkjet printers, laser printers, 3D printers, solid ink printers and plotters.

Audio and Video (AV) devices, such as, but not limited to, speakers, headphones, amplifiers and lights, which include lamps, strobes, DJ lighting, stage lighting, architectural lighting, special effect lighting, and lasers.

Other devices such as Digital to Analog Converter (DAC).

Input/Output Devices may further comprise, but not be limited to, touchscreens, networking device (e.g. devices disclosed in network 862 sub-module), data storage device (non-volatile storage 861), facsimile (FAX), and graphics/sound cards.

All rights including copyrights in the code included herein are vested in and the property of the Applicant. The Applicant retains and reserves all rights in the code included herein, and grants permission to reproduce the material only in connection with reproduction of the granted patent and for no other purpose.

V. Aspects

The following disclose various Aspects of the present disclosure. The various Aspects are not to be construed as patent claims unless the language of the Aspect appears as a patent claim. The Aspects describe various non-limiting embodiments of the present disclosure.

Aspect 1

A method comprising:
retrieving a message;
digitally securing the message comprising of the following:
  generating a first digital signature for the message,
  adding the first digital signature to a list of digital signatures for inclusion in the message,
  retrieving a list of allowed anticipated changes, and
  pre-signing the message for the allowed anticipated changes, wherein pre-signing the message comprises performing the following for each allowed anticipated change in the allowed anticipated changes:
    editing the message with the allowed anticipated change,
    generating a subsequent digital signature for the message edited with the allowed anticipated change, and
    adding the subsequent digital signature to the list of digital signatures for inclusion in the message; and
including the list of digital signatures in the message.

Aspect 2

The method of Aspect 1, wherein digitally securing the message comprises digitally securing the message with at least one DKIM signature.

Aspect 3

The method of Aspect 2, wherein pre-signing the message further comprises altering a selector for at least one anticipated change.

Aspect 4

The method of Aspect 2, wherein digitally securing the message further comprises digitally securing the message by publishing a DMARC policy on a sending domain.

Aspect 5

The method of Aspect 4, wherein digitally securing the message by publishing a DMARC policy on a sending domain further comprises at least one of sending and receiving DMARC reports.

Aspect 6

The method of Aspect 1, wherein digitally securing the message further comprises digitally securing the message by implementing at least one of the following protocols: SPF, ARC, and DNSSEC.

Aspect 7

The method of Aspect 1, wherein digitally securing the message comprises providing at least one of the following:
  improved message integrity,
  improved message non-repudiation,
  compliant forwarding with non-compliant ESP,
  message quality assessments,
  mechanism to detect illicit activity,
  marketing campaign message compliancy, and
  improved message deliverability.

Aspect 8

The method of Aspect 7, wherein providing the mechanism to detect illicit activity comprises a mechanism to detect at least one of phishing and spam.

Aspect 9

The method of Aspect 1, wherein retrieving the list of allowed anticipated changes comprises generating the list of allowed anticipated changes,

Aspect 10

The method of Aspect 9, wherein generating the list of allowed anticipated changes comprises at least one of manually generating the list of allowed anticipated changes and automatically generating the list of allowed anticipated changes.

Aspect 11

The method of Aspect 10, wherein manually generating the list of allowed anticipated changes comprises manually generating the list of allowed anticipated changes by at least one of end user and administrator.

Aspect 12

The method of Aspect 10, wherein automatically generating the list of allowed anticipated changes comprises automatically generating the list of allowed anticipated changes after retrieving the message.

Aspect 13

The method of Aspect 10, wherein automatically generating the list of allowed anticipated changes comprises generating the list of allowed anticipated changes using AI.

Aspect 14

The method of Aspect 13, wherein generating the list of allowed anticipated changes using the AI comprises training the AI.

Aspect 15

The method of Aspect 14, wherein training the AI comprises training using at least one of the following:
  previous at least one list of allowed anticipated changes and an associated message,
  user modifications of the previous at least one list of allowed anticipated changes,
  a database of common anticipated changes,
  web scraping, and
  behavior of at least one user.

Aspect 16

The method of Aspect 10, wherein automatically generating the list of allowed anticipated changes comprises generating the list of allowed anticipated changes using a macro.

Aspect 17

The method of Aspect 10, wherein automatically generating the list of allowed anticipated changes comprises generating the list of allowed anticipated changes by including common additions.

Aspect 18

The method of Aspect 17, wherein generating the list of allowed anticipated changes by including the common additions further comprises including common additions to a subject line.

Aspect 19

The method of Aspect 18, wherein including the common additions to the subject line further comprises including at least one of "RE:" and "FWD:".

Aspect 20

The method of Aspect 17 and Aspect 19, wherein generating the list of allowed anticipated changes by including the common additions further comprises including repetition parameters.

Aspect 21

The method of Aspect 9, wherein generating the list of allowed anticipated changes further comprises setting a length of a message body to be signed.

Aspect 22

The method of Aspect 21, wherein setting the length of the message body to be signed comprises anticipating an unsubscribe link to be added to the end of the body.

Aspect 23

A system configured for:
  retrieval of a message;
  digital securing of the message;
    wherein the digital securing of the message comprises the following:
      generate a first digital signature for the message,
      add the first digital signature to a list of digital signatures for inclusion in the message,
      retrieve a list of allowed anticipated changes, and
      pre-sign the message for the allowed anticipated changes, wherein presigning the message comprises the following for each allowed anticipated change in the allowed anticipated changes:
        edit the message with the allowed anticipated change,
        generate a subsequent digital signature for the message edited with the allowed anticipated change, and
        add the subsequent digital signature to the list of digital signatures for inclusion in the email message; and
  include the list of digital signatures in the email message to the MSA.

Aspect 24

The system of Aspect 23, wherein the digital securing of the message comprises at least one DKIM signature.

Aspect 25

The system of Aspect 24, wherein pre-sign the message further comprises at least one altered selector for at least one anticipated change.

Aspect 26

The system of Aspect 24, wherein the digital securing of the message further comprises at least one published DMARC policy on a sending domain.

Aspect 27

The system of Aspect 26, further comprising at least one of sending and receiving DMARC reports.

Aspect 28

The system of Aspect 23, wherein the digital securing of the message further comprises implementation of at least one of the following protocols: SPF, ARC, and DNSSEC.

Aspect 29

The system of Aspect 23, wherein the digital securing of the message comprises at least one of the following:
  improved message integrity,
  improved message non-repudiation,
  compliant forwarding with non-compliant ESP, message quality assessments,
mechanism to detect illicit activity,
marketing campaign message compliancy, and
improved message deliverability.

Aspect 30

The system of Aspect 29, wherein the mechanism to detect illicit activity comprises a mechanism to detect at least one of phishing and spam.

Aspect 31

The system of Aspect 23, further comprising generation of the list of allowed anticipated changes.

Aspect 32

The system of Aspect 31, further comprising at least one of manual generation of the list of allowed anticipated changes and automatic generation of the list of allowed anticipated changes.

Aspect 33

The system of Aspect 32, wherein the manual generation of the list of allowed anticipated changes comprises generation by at least one of end user and administrator.

Aspect 34

The system of Aspect 32, wherein the automatic generation of the list of allowed anticipated changes comprises automatic generation after retrieving the message.

Aspect 35

The system of Aspect 32, wherein the automatic generation of the list of allowed anticipated changes comprises AI generation.

Aspect 36

The system of Aspect 35, wherein the AI generation comprises AI training.

Aspect 37

The system of Aspect 36, wherein the AI training comprises AI training based at least one of the following training data sets:
- previous at least one list of allowed anticipated changes and an associated message,
- user modifications of the previous at least one list of allowed anticipated changes,
- a database of common anticipated changes,
- web scraping, and
- behavior of at least one user.

Aspect 38

The system of Aspect 32, wherein the automatic generation of the list of allowed anticipated changes comprises generation using a macro.

Aspect 39

The system of Aspect 32, wherein the automatic generation of the list of allowed anticipated changes comprises including common additions.

Aspect 40

The system of Aspect 39, wherein the common additions comprise common additions to a subject line.

Aspect 41

The system of Aspect 40, wherein the common additions to the subject line comprise at least one of "RE:" and "FWD:".

Aspect 42

The system of Aspect 39 and Aspect 41, wherein the common additions further comprise repetition parameters.

Aspect 43

The system of Aspect 31, wherein the generation of the list of allowed anticipated changes further comprises specification of a length of a message body to be signed.

Aspect 44

The system of Aspect 43, wherein the specification of a length of a message body to be signed comprises anticipation of an unsubscribe link to be added to the end of the body.

VI. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The invention claimed is:

1. A method comprising:
  retrieving a message;
  digitally securing the message, wherein digitally securing the message comprises:
    generating a first digital signature for the message,
    adding the first digital signature to a list of digital signatures for inclusion in the message,
    retrieving a list of allowed anticipated changes, and
    pre-signing the message for the allowed anticipated changes, wherein pre-signing the message comprises performing the following for each allowed anticipated change in the allowed anticipated changes:
      editing the message with the allowed anticipated change, generating a subsequent digital signature for the message edited with the allowed anticipated change, and adding the subsequent digital signature to the list of digital signatures for inclusion in the message; and including the list of digital signatures in the message.

2. The method of claim 1, wherein digitally securing the message comprises digitally securing the message with at least one DKIM signature.

3. The method of claim 2, wherein pre-signing the message further comprises altering a selector for at least one anticipated change.

4. The method of claim 2, wherein digitally securing the message further comprises digitally securing the message by publishing a DMARC policy on a sending domain.

5. The method of claim 1, wherein digitally securing the message comprises providing at least one of the following:

improved message integrity, improved message non-repudiation, compliant forwarding with non-compliant ESP, message quality assessments, mechanism to detect illicit activity, marketing campaign message compliancy, and improved message deliverability.

6. The method of claim 5, wherein providing the mechanism to detect illicit activity comprises a mechanism to detect at least one of phishing and spam.

7. The method of claim 1, wherein retrieving the list of allowed anticipated changes comprises generating the list of allowed anticipated changes.

8. The method of claim 7, wherein generating the list of allowed anticipated changes comprises at least one of manually generating the list of allowed anticipated changes and automatically generating the list of allowed anticipated changes.

9. The method of claim 8, wherein manually generating the list of allowed anticipated changes comprises manually generating the list of allowed anticipated changes by at least one of end user and administrator.

10. The method of claim 8, wherein automatically generating the list of allowed anticipated changes comprises automatically generating the list of allowed anticipated changes after retrieving the message.

11. The method of claim 8, wherein automatically generating the list of allowed anticipated changes comprises generating the list of allowed anticipated changes using AI.

12. The method of claim 11, wherein generating the list of allowed anticipated changes using the AI comprises training the AI using at least one of the following:

previous at least one list of allowed anticipated changes and an associated message, user modifications of the previous at least one list of allowed anticipated changes, a database of common anticipated changes, web scraping, and behavior of at least one user.

13. The method of claim 8, wherein automatically generating the list of allowed anticipated changes comprises generating the list of allowed anticipated changes using a macro.

14. The method of claim 8, wherein automatically generating the list of allowed anticipated changes comprises generating the list of allowed anticipated changes by including common additions.

15. The method of claim 14, wherein generating the list of allowed anticipated changes by including the common additions further comprises including the common additions to a subject line.

16. The method of claim 15, wherein including the common additions to the subject line further comprises including at least one of "RE:" and "FWD:".

17. The method of claim 16, wherein generating the list of allowed anticipated changes by including the common additions further comprises including repetition parameters.

18. The method of claim 7, wherein generating the list of allowed anticipated changes further comprises setting a length of a message body to be signed.

19. The method of claim 18, wherein setting the length of the message body to be signed comprises anticipating an unsubscribe link to be added to an end of the message body.

20. A non-transitory computer-readable medium comprising a set of instructions, which when executed by a computer perform a method for:

retrieval of a message;

digital securing of the message;

wherein the digital securing of the message comprises the following:

generate a first digital signature for the message, add the first digital signature to a list of digital signatures for inclusion in the message, retrieve a list of allowed anticipated changes, and pre-sign the message for the allowed anticipated changes, wherein pre-signing the message comprises the following for each allowed anticipated change in the allowed anticipated changes:

edit the message with the allowed anticipated change, generate a subsequent digital signature for the message edited with the allowed anticipated change, and add the subsequent digital signature to the list of digital signatures for inclusion in the message; and include the list of digital signatures in the message.

21. The non-transitory computer-readable medium of claim 20, wherein digitally securing the message comprises providing at least one of the following:

improved message integrity, improved message non-repudiation, compliant forwarding with non-compliant ESP, message quality assessments, mechanism to detect illicit activity, marketing campaign message compliancy, and improved message deliverability.

22. The non-transitory computer-readable medium of claim 20, wherein digitally securing the message comprises digitally securing the message with at least one DKIM signature.

23. The non-transitory computer-readable medium of claim 20, further comprising generating the list of allowed anticipated changes, the list of allowed anticipated changes comprising at least one of the following: manually generating the list of allowed anticipated changes and automatically generating the list of allowed anticipated changes.

24. The non-transitory computer-readable medium of claim 23, wherein manually generating the list of allowed anticipated changes comprises manually generating the list of allowed anticipated changes by at least one of end user and administrator; and wherein automatically generating the list of allowed anticipated changes comprises automatically generating the list of allowed anticipated changes after retrieving the message.

25. The non-transitory computer-readable medium of claim 23, wherein automatically generating the list of allowed anticipated changes comprises generating the list of allowed anticipated changes using AI based on a training of at least one of the following:
- previous at least one list of allowed anticipated changes and an associated message,
- user modifications of the previous at least one list of allowed anticipated changes,
- a database of common anticipated changes,
- web scraping, and
- behavior of at least one user.

26. The non-transitory computer-readable medium of claim 23, wherein automatically generating the list of allowed anticipated changes comprises generating the list of allowed anticipated changes using a macro.

27. The non-transitory computer-readable medium of claim 23, wherein automatically generating the list of allowed anticipated changes comprises generating the list of allowed anticipated changes by including common additions.

28. The non-transitory computer-readable medium of claim 27, wherein generating the list of allowed anticipated changes by including the common additions further comprises including the common additions to a subject line.

29. The non-transitory computer-readable medium of claim 28, wherein including the common additions to the subject line further comprises including at least one of "RE:" and "FWD:".

30. The non-transitory computer-readable medium of claim 23, wherein generating the list of allowed anticipated changes further comprises setting a length of a message body to be signed.

* * * * *